(12) United States Patent
Ely et al.

(10) Patent No.: US 9,753,436 B2
(45) Date of Patent: *Sep. 5, 2017

(54) ROTARY INPUT MECHANISM FOR AN ELECTRONIC DEVICE

(71) Applicant: Apple Inc., Cupertino, CA (US)

(72) Inventors: Colin M. Ely, Cupertino, CA (US); Fletcher Rothkopf, Cupertino, CA (US); Christopher Matthew Werner, Cupertino, CA (US); John B. Morrell, Cupertino, CA (US); Camille Moussette, Cupertino, CA (US); Duncan Kerr, Cupertino, CA (US); Anna-Katrina Shedletsky, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/966,719

(22) Filed: Dec. 11, 2015

(65) Prior Publication Data

US 2016/0098016 A1 Apr. 7, 2016

Related U.S. Application Data

(63) Continuation of application No. PCT/US2014/040728, filed on Jun. 3, 2014, which is
(Continued)

(51) Int. Cl.
*G04G 21/00* (2010.01)
*G04G 21/08* (2010.01)
(Continued)

(52) U.S. Cl.
CPC .............. *G04G 21/00* (2013.01); *G04B 3/04* (2013.01); *G04C 3/00* (2013.01); *G04C 3/004* (2013.01);
(Continued)

(58) Field of Classification Search
CPC .......... G04G 21/00; G04G 21/08; G04C 3/00; G04C 3/04
(Continued)

(56) References Cited

U.S. PATENT DOCUMENTS 2,237,860 A 4/1941 Bolle
2,497,935 A 2/1950 Feurer
(Continued)

FOREIGN PATENT DOCUMENTS

CH 1888928 1/1937
CN 1302740 9/2001
(Continued)

OTHER PUBLICATIONS

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
(Continued)

*Primary Examiner* — Amy Cohen Johnson
*Assistant Examiner* — Daniel Wicklund
(74) *Attorney, Agent, or Firm* — Brownstein Hyatt Farber Schreck, LLP

(57) ABSTRACT

One embodiment of the present disclosure is directed to a wearable electronic device. The wearable electronic device includes an enclosure having a sidewall with a button aperture defined therethrough, a display connected to the enclosure, a processing element in communication with the display. The device also includes a sensing element in communication with the processing element and an input button at least partially received within the button aperture and in communication with the sensing element, the input button configured to receive two types of user inputs. During
(Continued)

operation, the sensing element tracks movement of the input button to determine the two types of user inputs.

20 Claims, 17 Drawing Sheets

Related U.S. Application Data a continuation of application No. PCT/US2013/045264, filed on Jun. 11, 2013.

(51) Int. Cl.
G04C 3/00 (2006.01)
G04C 3/04 (2006.01)
G04B 3/04 (2006.01)
H01H 35/00 (2006.01)
G01D 5/24 (2006.01)
G01D 5/26 (2006.01)
G01D 5/241 (2006.01)

(52) U.S. Cl.
CPC .............. G04C 3/04 (2013.01); G04G 21/08 (2013.01); G01D 5/241 (2013.01); G01D 5/26 (2013.01); H01H 35/00 (2013.01)

(58) Field of Classification Search
USPC ....... 368/69, 70, 74, 319–321; 200/4, 5, 600
See application file for complete search history.

(56) References Cited

U.S. PATENT DOCUMENTS

| | | |
|---|---|---|
| 2,771,734 A | 11/1956 | Morf |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,495,398 A | 2/1970 | Widmer et al. |
| 3,621,649 A | 11/1971 | Vulcan et al. |
| 4,007,347 A | 2/1977 | Haber |
| 4,031,341 A * | 6/1977 | Wuthrich ............... G04C 3/005 368/224 |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | LaMarche |
| 4,287,400 A * | 9/1981 | Kitik ................. H01H 21/085 368/289 |
| 4,289,400 A | 9/1981 | Kubota et al. |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A * | 4/1983 | Meyrat ................ G04C 3/007 368/188 |
| 4,417,824 A | 11/1983 | Paterson et al. |
| 4,581,509 A | 4/1986 | Sanford et al. |
| 4,600,316 A | 7/1986 | Besson |
| 4,617,461 A | 10/1986 | Subbarao et al. |
| 4,641,026 A | 2/1987 | Garcia, Jr. |
| 4,670,737 A | 6/1987 | Rilling |
| 4,783,772 A | 11/1988 | Umemoto et al. |
| 4,884,073 A | 11/1989 | Souloumiac |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 5,034,602 A | 7/1991 | Garcia et al. |
| 5,214,278 A | 5/1993 | Banda |
| 5,258,592 A | 11/1993 | Nishikawa et al. |
| 5,288,993 A | 2/1994 | Bidiville et al. |
| 5,347,123 A * | 9/1994 | Jackson ............... H03K 17/968 250/227.22 |
| 5,383,166 A | 1/1995 | Gallay |
| 5,471,054 A | 11/1995 | Watanabe |
| 5,572,314 A | 11/1996 | Hyman et al. |
| 5,583,560 A | 12/1996 | Florin et al. |
| 5,726,645 A | 3/1998 | Kamon et al. |
| 5,748,111 A | 5/1998 | Bates |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,963,332 A | 10/1999 | Feldman et al. |
| 6,069,567 A | 5/2000 | Zawilski |
| 6,134,189 A | 10/2000 | Carrard |
| 6,154,201 A * | 11/2000 | Levin ..................... G05G 9/047 345/156 |
| 6,175,679 B1 | 1/2001 | Veligdan et al. |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,422,740 B1 * | 7/2002 | Leuenberger .......... G04C 3/007 368/190 |
| 6,477,117 B1 | 11/2002 | Narayanaswami et al. |
| 6,525,278 B2 | 2/2003 | Villain et al. |
| 6,556,222 B1 | 4/2003 | Narayanaswami |
| 6,641,438 B1 | 11/2003 | Billman |
| 6,646,635 B2 | 11/2003 | Pogatetz et al. |
| 6,661,438 B1 | 12/2003 | Shiraishi et al. |
| 6,794,992 B1 | 9/2004 | Rogers |
| 6,809,275 B1 | 10/2004 | Cheng et al. |
| 6,888,076 B2 | 5/2005 | Hetherington |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,081,905 B1 | 7/2006 | Raghunath et al. |
| 7,119,289 B2 | 10/2006 | Lacroix |
| 7,135,673 B2 | 11/2006 | Saint Clair |
| 7,167,083 B2 | 1/2007 | Giles |
| 7,265,336 B2 | 9/2007 | Hataguchi et al. |
| 7,274,303 B2 | 9/2007 | Dresti et al. |
| 7,358,481 B2 | 4/2008 | Yeoh et al. |
| 7,369,308 B2 | 5/2008 | Tsuruta et al. |
| 7,404,667 B2 | 7/2008 | Born et al. |
| 7,465,917 B2 | 12/2008 | Chin et al. |
| 7,520,664 B2 | 4/2009 | Wai |
| 7,528,824 B2 | 5/2009 | Kong |
| 7,545,367 B2 | 6/2009 | Sunda et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,710,456 B2 | 5/2010 | Koshiba et al. |
| 7,761,246 B2 | 7/2010 | Matsui |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,597 B2 | 9/2010 | Silverstein et al. |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 8,063,892 B2 | 11/2011 | Shahoian et al. |
| 8,138,488 B2 | 3/2012 | Grot |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,312,495 B2 | 11/2012 | Vanderhoff |
| 8,368,677 B2 | 2/2013 | Yamamoto |
| 8,373,661 B2 | 2/2013 | Lan et al. |

(56) References Cited

U.S. PATENT DOCUMENTS

| | | | |
|---|---|---|---|
| 8,410,971 B2 | 4/2013 | Friedlander | |
| 8,432,368 B2 | 4/2013 | Momeyer et al. | |
| 8,441,450 B2 | 5/2013 | Degner et al. | |
| 8,446,713 B2 | 5/2013 | Lai | |
| 8,477,118 B2 | 7/2013 | Lan et al. | |
| 8,493,190 B2 | 7/2013 | Periquet et al. | |
| 8,525,777 B2 | 9/2013 | Stavely et al. | |
| 8,568,313 B2 | 10/2013 | Sadhu | |
| 8,576,044 B2 | 11/2013 | Chapman | |
| 8,593,598 B2 | 11/2013 | Chen et al. | |
| 8,614,881 B2 | 12/2013 | Yoo | |
| 8,666,682 B2 | 3/2014 | LaVigne et al. | |
| 8,704,787 B2 | 4/2014 | Yamamoto | |
| 8,711,093 B2 | 4/2014 | Ong et al. | |
| 8,724,087 B2 | 5/2014 | Van De Kerkhof et al. | |
| 8,730,167 B2 | 5/2014 | Ming et al. | |
| 8,743,088 B2 | 6/2014 | Watanabe | |
| 8,804,993 B2 | 8/2014 | Shukla et al. | |
| 8,824,245 B2 | 9/2014 | Lau et al. | |
| 8,847,741 B2 | 9/2014 | Birnbaum et al. | |
| 8,859,971 B2 | 10/2014 | Weber | |
| 8,860,674 B2 | 10/2014 | Lee et al. | |
| 8,863,219 B2 | 10/2014 | Brown et al. | |
| 8,878,657 B2 | 11/2014 | Periquet et al. | |
| 8,885,856 B2 | 11/2014 | Sacha | |
| 8,895,911 B2 | 11/2014 | Takahashi | |
| 8,920,022 B2 | 12/2014 | Ishida et al. | |
| 8,922,399 B2 | 12/2014 | Bajaj et al. | |
| 8,928,452 B2 | 1/2015 | Kim et al. | |
| 8,994,827 B2 | 3/2015 | Mistry et al. | |
| 9,024,733 B2 | 5/2015 | Wouters | |
| 9,041,663 B2 | 5/2015 | Westerman | |
| 9,086,738 B2 | 7/2015 | Leung et al. | |
| 9,105,413 B2 | 8/2015 | Hiranuma et al. | |
| 9,176,598 B2 | 11/2015 | Sweetser et al. | |
| 9,213,409 B2 | 12/2015 | Redelsheimer et al. | |
| 9,223,296 B2* | 12/2015 | Yang | G04G 17/04 |
| 9,449,770 B2 | 9/2016 | Sanford et al. | |
| 2001/0053109 A1* | 12/2001 | Ehrsam | G04C 3/005 368/190 |
| 2003/0174590 A1 | 9/2003 | Arikawa et al. | |
| 2004/0082414 A1 | 4/2004 | Knox | |
| 2005/0075558 A1 | 4/2005 | Vecerina et al. | |
| 2005/0164623 A1* | 7/2005 | Huynh | H03K 17/941 454/69 |
| 2006/0250377 A1 | 11/2006 | Zadesky et al. | |
| 2007/0013775 A1 | 1/2007 | Shin | |
| 2007/0050054 A1 | 3/2007 | Sambandam Guruparan et al. | |
| 2007/0122076 A1* | 5/2007 | Ishiyama | G01C 9/00 385/19 |
| 2007/0124772 A1 | 5/2007 | Bennett et al. | |
| 2007/0211042 A1 | 9/2007 | Kim et al. | |
| 2007/0222756 A1 | 9/2007 | Wu et al. | |
| 2007/0229671 A1* | 10/2007 | Takeshita | H04N 1/00127 348/211.2 |
| 2007/0247421 A1 | 10/2007 | Orsley et al. | |
| 2008/0067050 A1* | 3/2008 | Ieda | E05B 81/76 200/512 |
| 2008/0130914 A1 | 6/2008 | Cho | |
| 2009/0051649 A1 | 2/2009 | Rondel | |
| 2009/0073119 A1 | 3/2009 | Le et al. | |
| 2009/0146975 A1 | 6/2009 | Chang | |
| 2009/0152452 A1 | 6/2009 | Lee et al. | |
| 2009/0217207 A1 | 8/2009 | Kagermeier et al. | |
| 2009/0285443 A1 | 11/2009 | Camp et al. | |
| 2009/0312051 A1 | 12/2009 | Hansson et al. | |
| 2009/0322583 A1 | 12/2009 | Reams et al. | |
| 2010/0033430 A1 | 2/2010 | Kakutani et al. | |
| 2010/0053468 A1 | 3/2010 | Harvill | |
| 2010/0081375 A1 | 4/2010 | Rosenblatt et al. | |
| 2010/0149099 A1 | 6/2010 | Elias | |
| 2010/0187074 A1* | 7/2010 | Manni | G04C 3/004 200/4 |
| 2011/0007468 A1 | 1/2011 | Burton et al. | |
| 2011/0090148 A1 | 4/2011 | Li et al. | |
| 2011/0235471 A1* | 9/2011 | Luk | G04C 3/005 368/69 |
| 2012/0041925 A1 | 2/2012 | Pope et al. | |
| 2012/0067711 A1 | 3/2012 | Yang | |
| 2012/0068833 A1 | 3/2012 | Rothkopf et al. | |
| 2012/0068857 A1 | 3/2012 | Rothkopf et al. | |
| 2012/0075082 A1 | 3/2012 | Rothkopf et al. | |
| 2012/0112859 A1* | 5/2012 | Park | H01H 25/002 335/205 |
| 2012/0113044 A1 | 5/2012 | Strazisar et al. | |
| 2012/0206248 A1 | 8/2012 | Biggs | |
| 2013/0037396 A1 | 2/2013 | Yu | |
| 2013/0087443 A1 | 4/2013 | Kikuchi | |
| 2013/0163395 A1* | 6/2013 | Ferri | G04C 3/001 368/290 |
| 2014/0071050 A1 | 3/2014 | Armstrong-Muntner | |
| 2014/0071098 A1 | 3/2014 | You | |
| 2014/0132516 A1 | 5/2014 | Tsai et al. | |
| 2014/0197936 A1 | 7/2014 | Biggs et al. | |
| 2014/0327630 A1 | 11/2014 | Burr et al. | |
| 2014/0340318 A1 | 11/2014 | Stringer et al. | |
| 2015/0041289 A1 | 2/2015 | Ely | |
| 2015/0168178 A1* | 6/2015 | Hoover | G04B 27/02 368/321 |
| 2015/0221460 A1 | 8/2015 | Teplitxky et al. | |
| 2015/0227217 A1 | 8/2015 | Fukumoto | |
| 2015/0341031 A1* | 11/2015 | Marquas | G06F 3/0338 200/600 |
| 2016/0054813 A1 | 2/2016 | Schediwy et al. | |
| 2016/0058375 A1 | 3/2016 | Rothkopf et al. | |
| 2016/0061636 A1 | 3/2016 | Gowreesunker et al. | |
| 2016/0258784 A1 | 9/2016 | Boonsom et al. | |
| 2016/0306437 A1 | 10/2016 | Zhang et al. | |
| 2016/0313703 A1 | 10/2016 | Ely et al. | |
| 2016/0327911 A1* | 11/2016 | Eim | G06F 1/163 |
| 2016/0378069 A1 | 12/2016 | Rothkopf et al. | |
| 2016/0378070 A1 | 12/2016 | Rothkopf et al. | |
| 2016/0378071 A1 | 12/2016 | Rothkopf et al. | |
| 2016/0378072 A1 | 12/2016 | Ely et al. | |
| 2017/0003655 A1 | 1/2017 | Ely | |
| 2017/0010751 A1 | 1/2017 | Shedletsky | |
| 2017/0011873 A1 | 1/2017 | Ely et al. | |
| 2017/0045958 A1* | 2/2017 | Battlogg | A61F 2/38 |
| 2017/0069443 A1 | 3/2017 | Wang et al. | |
| 2017/0069444 A1 | 3/2017 | Wang et al. | |
| 2017/0069447 A1 | 3/2017 | Wang et al. | |

FOREIGN PATENT DOCUMENTS

| | | |
|---|---|---|
| CN | 1445627 | 10/2003 |
| CN | 1624427 | 6/2005 |
| CN | 103191557 | 7/2013 |
| CN | 103645804 | 3/2014 |
| CN | 103852090 | 6/2014 |
| CN | 103956006 | 7/2014 |
| CN | 203732900 | 7/2014 |
| CN | 103995456 | 8/2014 |
| CN | 203941395 | 11/2014 |
| CN | 105096979 | 11/2015 |
| CN | 105547146 | 5/2016 |
| DE | 102008023651 | 11/2009 |
| EP | 0556155 | 8/1993 |
| EP | 1345095 | 9/2003 |
| EP | 1669724 | 6/2006 |
| EP | 2375295 | 10/2011 |
| EP | 2720129 | 4/2014 |
| FR | 2030093 | 10/1970 |
| FR | 2801402 | 5/2001 |
| GB | 2433211 | 6/2007 |
| JP | S5734457 | 2/1982 |
| JP | H05203465 | 8/1993 |
| JP | 2001202178 | 7/2001 |
| JP | 2003151410 | 5/2003 |
| JP | 2003331693 | 11/2003 |
| JP | 2004184396 | 7/2004 |
| JP | 2007311153 | 11/2007 |
| JP | 2008053980 | 3/2008 |

(56) References Cited

FOREIGN PATENT DOCUMENTS

| | | |
|---|---|---|
| JP | 2008122377 | 5/2008 |
| JP | 2008235226 | 10/2008 |
| JP | 2010186572 | 8/2010 |
| JP | 2011165468 | 8/2011 |
| KR | 20080045397 | 5/2008 |
| NL | 1040225 | 11/2014 |
| WO | WO01/22038 | 3/2001 |
| WO | WO01/69567 | 9/2001 |
| WO | WO2010/058376 | 5/2010 |
| WO | WO2012/083380 | 6/2012 |
| WO | WO2014/018118 | 1/2014 |
| WO | WO2015/147756 | 10/2015 |

OTHER PUBLICATIONS

Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "RedEye mini Plug-in Universal Remote Adapter for iPhone, iPodtouch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, Vyzin Electronics Private Limited launches "Vesag Watch," http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id=5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Tran et al., "Universal Programmable Remote Control/Telephone," www.ip.com, 2 pages, May 1, 1992.
International Search Report and Written Opinion, PCT/US2013/045264, 10 pages, Mar. 25, 2014.
International Search Report and Written Opinion, PCT/US2014/040728, 14 pages, Oct. 15, 2014.
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
Sherr, Sol, "Input Devices," p. 55, Mar. 1988.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
Krishnan et al., "A Miniature Surface Mount Reflective Optical Shaft Encoder," Hewlett-Packard Journal, Article 8, pp. 1-6, Dec. 1996.

\* cited by examiner

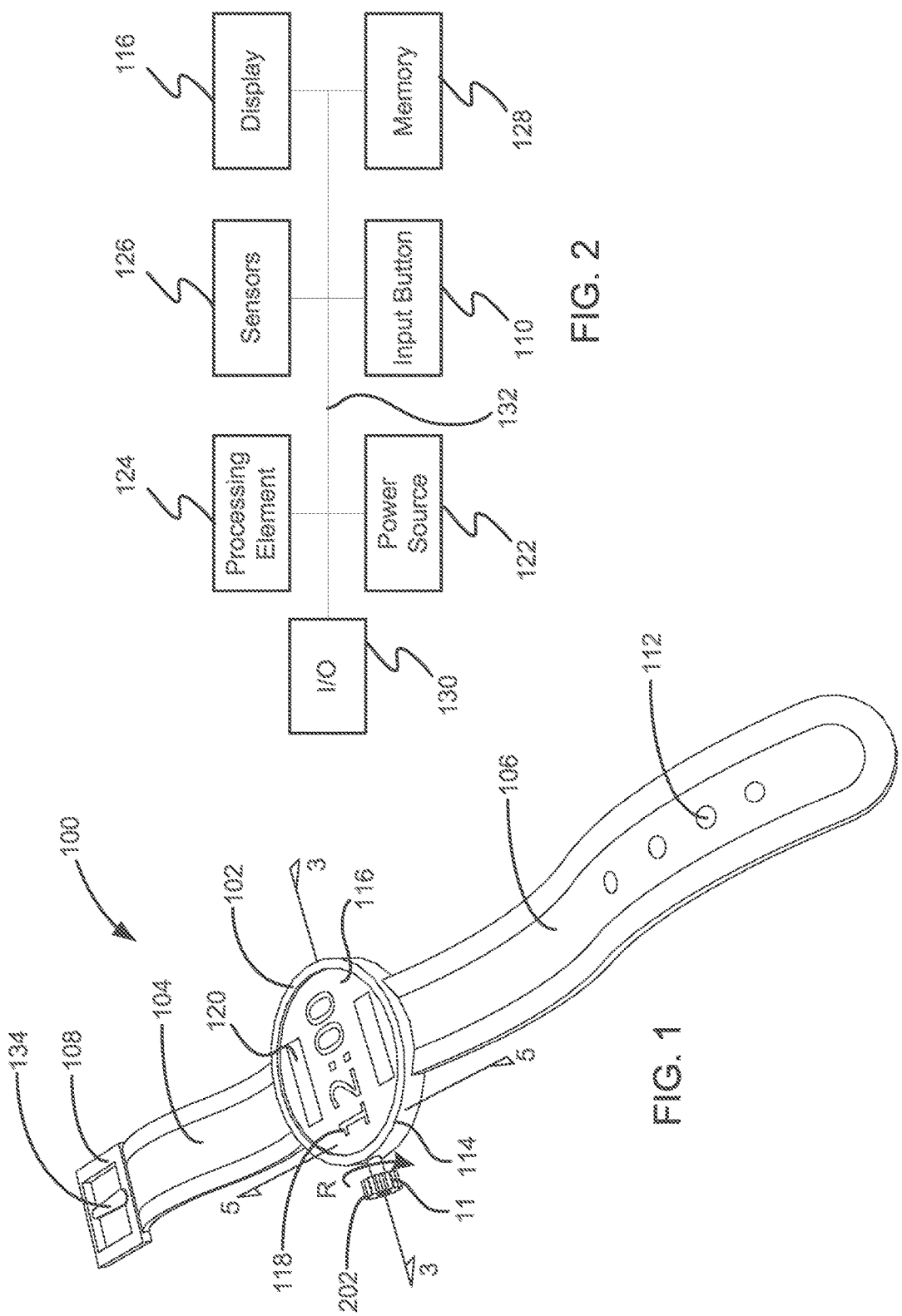

ROTARY INPUT MECHANISM FOR AN ELECTRONIC DEVICE

CROSS-REFERENCE TO RELATED APPLICATION(S)

This patent application is a continuation patent application of PCT/US2014/040728, filed Jun. 3, 2014, and titled "Rotary Input Mechanism for an Electronic Device," which claims priority to PCT Application No. PCT/US2013/045264, filed Jun. 11, 2013, and titled "Rotary Input Mechanism for an Electronic Device," the disclosures of which are hereby incorporated herein by reference in their entireties.

FIELD

The present disclosure relates generally to electronic devices and, more specifically, to input devices for computing devices.

BACKGROUND

Many types of electronic devices, such as smart phones, gaming devices, computers, watches, and the like, use input devices, such as buttons or switches to receive user input. However, the enclosure for the devices includes an aperture or other opening to allow the button or switch (or other selectable item) to move. These apertures allow water, air, and other environmental items to enter into the enclosure and potentially damage the internal electronics. Additionally, many input devices, such as buttons or switches, may allow for a single type of input. For example, actuating a button may transmit one type of signal, which is generated by compressing a dome switch that completes a circuit. As electronic devices reduce in size, it may be desirable to have fewer input buttons or devices, without reducing functionality or the number of input types that can be used by a user to provide information to a device.

SUMMARY

One example of the present disclosure includes a wearable electronic device. The wearable electronic device includes an enclosure having a sidewall with a button aperture defined therethrough, a processing element housed within the enclosure, a sensing element in communication with the processing element, and an input device at least partially received within the button aperture and in communication with the sensing element, the input device configured to receive at least a first and a second type of user input. Generally, the sensing element is operative to track a movement of the input button and output a signal and the processing element is operative to distinguish between the first and second type of user input, based on the signal.

Another example of the disclosure includes a watch. The watch includes a hub or watch face. The hub includes a processor, a sensing element, and a crown. The crown includes a trackable element and the sensing element is configured to sense movement of the crown by tracking the movements of the trackable element. The watch also includes a strap connected to the hub and configured to wrap around a portion of a user.

BRIEF DESCRIPTION OF THE DRAWINGS

FIG. 1 is a top plan view of a wearable electronic device including a multi-input device.

FIG. 2 is a simplified block diagram of the wearable electronic device.

DETAILED DESCRIPTION

Figure 3:
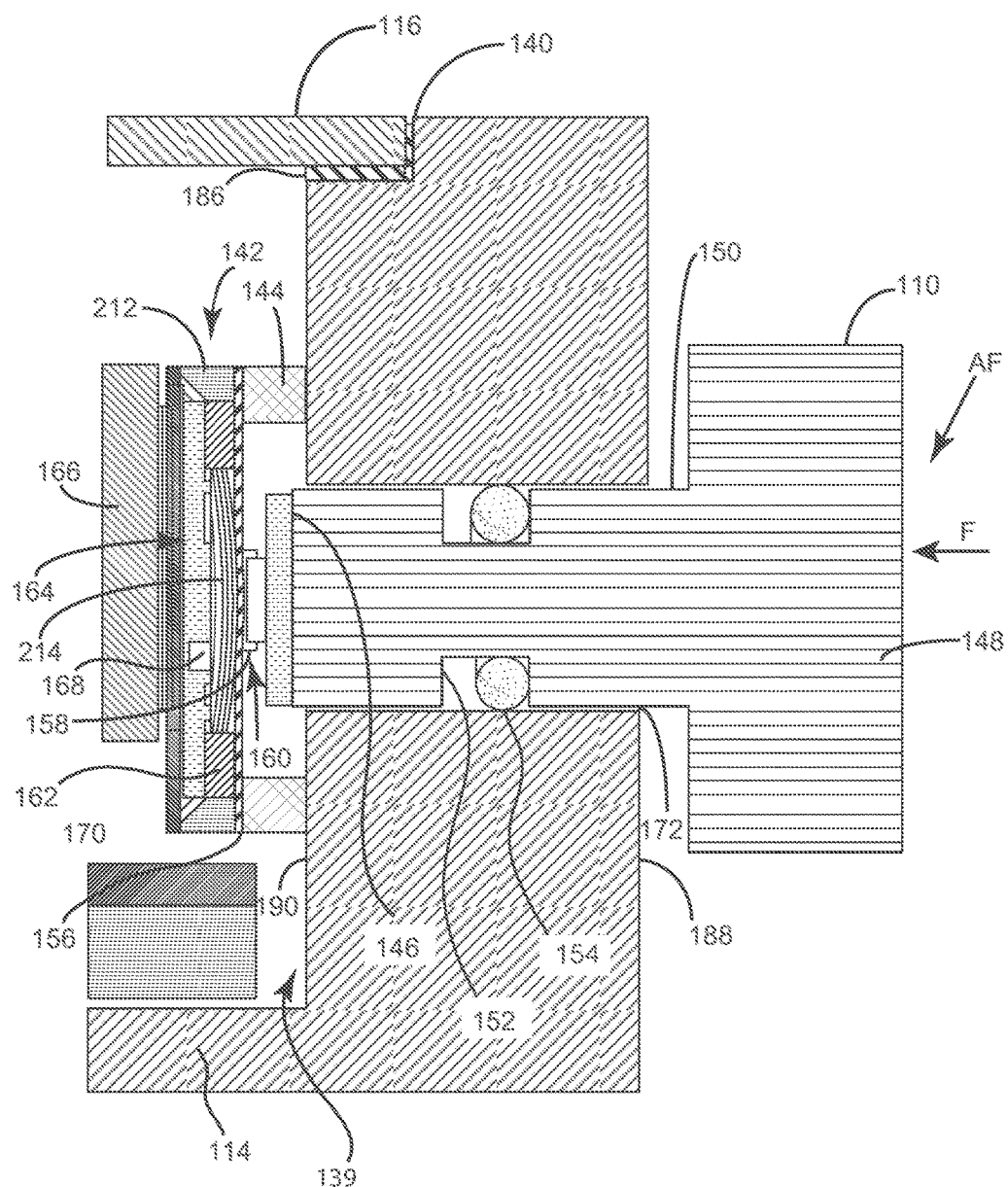
FIG. 3 is a cross-section view of the wearable electronic device taken along line 3-3 in FIG. 1.

In some embodiments herein, a wearable electronic device including a multi-input button is disclosed. The wearable electronic device may be a watch, portable music player, health monitoring device, computing or gaming device, smart phone, or the like. In some embodiments, the wearable electronic device is a watch that can be worn around the wrist of a user. In embodiments, the multi-input button forms a crown for the watch and is connected to a sidewall of an enclosure for the device. The multi-input button can be pressed to input a first type of input and can be rotated to input a second type of input. Additionally, in some instances, the button can be pressed on or off axis to activate a third input.

In a specific implementation, the wearable device includes a rotary encoder to detect rotation of the multi-input button, as well as a sensor that receives non-rotational type inputs. In one embodiment, the wearable device includes an enclosure and a flange or head extending from the enclosure. The head or crown is connected to a spindle or stem, which is received within the enclosure and a trackable element or encoder is attached to a bottom end of the spindle. The head extends from the enclosure and as the head is rotated, such as due to a user turning the head, the trackable element on the bottom of the stem rotates, passing over a rotary sensor contained within the enclosure. The rotary sensor senses movement of the stem and the head. Additionally, the stem may be movably (e.g., slidably) connected to the enclosure such that the user can press the head and the stem can move a predetermined distance. In this example, a switch (such as a tactile switch) or a sensor, can detect vertical or horizontal movement of the stem. In this manner, the multi-input button can detect rotational inputs, as well as compression-type inputs.

The stem and other portions of the multi-input button may include sealing members, such as O-rings, seal cups, or membrane seals that seal certain components of the wearable device from environmental elements, such as water. The stem and the enclosure aperture may be selected such that the stem may move within the enclosure without breaking the seal or otherwise creating a flow pathway into the internal component held within the enclosure. As an example, the stem may have a slightly smaller diameter than the enclosure aperture and an O-ring may be received around the stem within the enclosure aperture. In this example, the O-ring is a compressible material, such as foam, that can be compressed when a user exerts a force. As one side of the O-ring compresses due to the user force, the other side can expand to increase, maintain a seal of the enclosure aperture around the stem. This allows the stem to move within the enclosure diameter, without unsealing a pathway into the enclosure.

Additionally, in some embodiments, the multi-input button can be actuated to provide haptic feedback to a user. For example, in embodiments where the stem is movable within the enclosure a device, such as an actuator, may move the stem. When actuated, the stem may selectively move the head to provide feedback to a user.

Turning now to the figures, an illustrative wearable electronic device will now be discussed in more detail. FIG. 1 is a top plan view of a wearable electronic device. FIG. 2 is a simplified block diagram of the wearable electronic device of FIG. 1. With reference to FIGS. 1 and 2, the wearable electronic device 100 may include a hub 102 or computing center or element. In embodiments where the electronic device 100 is configured to be worn by a user, the device 100 may include one or more straps 104, 106 that may connect to opposite sides of the hub 102. Each of the straps 104, 106 may wrap around a portion of a wrist, arm, leg, chest, or other portion of a user's body to secure the hub 102 to the user. For example, the ends of each of the straps 104, 106 may be connected together by a fastening mechanism 108. The fastening mechanism 108 can be substantially any type of fastening device, such as, but not limited, to, as lug, hook and loop structure, magnetic fasteners, snaps, buttons, clasps or the like. However, in one embodiment, such as the one shown in FIG. 1, the fastening mechanism 108 is a buckle including a prong 134 or element that can be inserted into one or more apertures 112 in the second strap 106 to secure the first and second straps 104, 106 together.

The hub 102 of the wearable electronic device generally contains the computing and processing elements of the wearable electronic device 100. FIG. 3 is a partial cross-section view of the hub 102 taken along line 3-3 in FIG. 1. With reference to FIGS. 1-3, the hub 102 may include a display 116 at least partially surrounded by an enclosure 114. In some embodiments, the display 116 may form a face of the hub 102 and the enclosure 114 may abut the edges and/or a portion of the backside of the display 116. Additionally, the internal components of the wearable device 100 may be contained within the enclosure 114 between the display 116 and the enclosure 114. The enclosure 114 protects the internal components of the hub 102, as well as connects the display 116 to the hub 102.

The enclosure 114 may be constructed out of a variety of materials, such as, but not limited to, plastics, metals, alloys, and so on. The enclosure 114 includes a button aperture 172 (see FIG. 3) to receive the input button 110 or a portion thereof. The button aperture 172 forms a channel within a sidewall 188 of the enclosure 114 and extends from an outer surface 188 of the enclosure 114 to an interior surface 190. The button aperture 172 generally is configured to correspond to a size/shape of, or accept, a stem or spindle of the input button 110. That said, the button aperture 172 may be otherwise shaped and sized.

The enclosure 114 may also include a groove 186 defined on a top surface to receive the display 116. With reference to FIGS. 1 and 3, the display 116 may be connected to the enclosure 114 through adhesive or other fastening mechanisms. In this example, the display is seated within a recessed portion or groove of the enclosure and the enclosure extends at least partially around the edges of the display and may be fastened or affixed thereto, but may leave at least a portion of the rear of the display free or unsupported by the housing. However, in other embodiments, the display and enclosure may be otherwise connected together.

The display 116 may be substantially any type of display screen or device that can provide a visual output for the wearable device 100. As an example, the display 116 may be a liquid crystal display, a light emitting diode display, or the like. Additionally, the display 116 may also be configured to receive a user input, such as a multi-touch display screen that receives user inputs through capacitive sensing elements. In many embodiments, the display 116 may be dynamically variable; however, in other embodiments, the display 116 may be a non-electronic component, such as a painted faceplate, that may not dynamically change.

The display 116 may show a plurality of icons 118, 120 or other graphics that are selectively modifiable. As an example, a first graphic 118 may include a time graphic that changes its characters to represent the time changes, e.g., numbers to represent hours, minutes, and seconds. A second graphic 120 may include a notification graphic, such as, battery life, messages received, or the like. The two graphics 118, 120 may be positioned substantially anywhere on the display 116 and may be varied as desired. Additionally, the number, size, shape, and other characteristics of the graphics 118, 120 may be changed as well.

The input button 110 extends from and attaches to or passes through the enclosure 114. The input button 110 will be discussed in more detail below, but generally allows a user to provide input to the wearable electronic device 100, as well as optionally provide haptic feedback to a user.

With reference to FIG. 2, the wearable electronic device includes a plurality of internal processing or computing elements. For example, the wearable electronic device 100 may include a power source 122, one or more processing elements 124, a memory component 128, one or more sensors 126, and an input/output component 130. Each of the internal components may be received within the enclosure 114 and may be in communication through one or more systems buses 132, traces, printed circuit boards, or other communication mechanisms.

The power source 122 provides power to the hub 102 and other components of the wearable device 100. The power source 122 may be a battery or other portable power element. Additionally, the power source 122 may be rechargeable or replaceable.

The processing element 124 or processor is substantially any type of device that can receive and execute instructions. For example, the processing element 124 may be a processor, microcomputer, processing unit or group of processing units or the like. Additionally, the processing element 124 may include one or more processors and in some embodiments may include multiple processing elements.

The one or more sensors 126 may be configured to sense a number of different parameters or characteristics that may be used to influence one or more operations of the wearable electronic device 100. For example, the sensors 126 may include accelerometers, gyroscopes, capacitive sensors, light sensors, image sensors, pressure or force sensors, or the like. As will be discussed in more detail below, one or more of the sensors 126 may be used in conjunction with the input button 110 or separate therefrom, to provide user input to the hub 102.

With continued reference to FIG. 2, the memory component 128 stores electronic data that may be utilized by the wearable device 100. For example, the memory component 128 may store electrical data or content e.g., audio files, video files, document files, and so on, corresponding to various applications. The memory 128 may be, for example, non-volatile storage, a magnetic storage medium, optical storage medium, magneto-optical storage medium, read only memory, random access memory, erasable programmable memory, or flash memory.

The input/output interface 130 may receive data from a user or one or more other electronic devices. Additionally, the input/output interface 130 may facilitate transmission of data to a user or to other electronic devices. For example, the input/output interface 130 may be used to receive data from a network, or may be used to send and transmit electronic signals via a wireless or wired connection (Internet, WiFi, Bluetooth, and Ethernet being a few examples). In some embodiments, the input/output interface 130 may support multiple network or communication mechanisms. For example, the network/communication interface 130 may pair with another device over a Bluetooth network to transfer signals to the other device, while simultaneously receiving data from a WiFi or other network.

The input button 110 will now be discussed in more detail. With reference to FIG. 3, the input button 110 includes a head 148 and a stem 150 or spindle. The stem 150 is received into the button aperture 172 defined in the enclosure 114 and the head 148 extends outwards from the stem 150 outside of the enclosure 114. In embodiments where the wearable electronic device 100 is a watch, the input button 110 forms a crown for the watch, with head 148 acting as a user engagement surface to allow the user to rotate, pull, and/or push the crown 110 or input button.

With reference to FIG. 1, the head 148 is generally a flange shaped member that may have a cylindrical body and a rounded or flat top. Additionally, the head 148 may optionally include a plurality of ridges 202 or other tactile features. The ridges 202 may enhance the friction between a user's finger or fingers and the head 148, making it easier for the user to rotate or pull the head 148, and may provide indicators to a user (similar to mile markers on a road) that allow a user to determine the number of rotations. For example, the head 148 may include a ridge 202 every quarter around the outer surface of the head 148 that can indicate to a user when the head has rotated 90 degrees. However, in other embodiments, the ridge 202 may be omitted or other features may be used.

With reference again to FIG. 3, the stem 150 may be a generally cylindrically shaped member and may extend from the head 148. The head 148 and the stem 150 may be integrally formed or may be discrete components that are fixedly attached together. The stem 150 may also include a sealing groove 152 defined around a portion of its outer circumference. The sealing groove 152 is configured to receive a sealing member, such as an O-ring 154 or seal cup. In some embodiments, the stem 150 has a longer length than a length of the button aperture 172. In this manner, opposite ends of the stem 150 extend from either side of the button aperture 172. In these embodiments, the head 148 may be spatially separated from the outer surface of the enclosure by the length of the stem 150 that extends outward from the outer end of the button aperture. However, in other embodiments the stem 150 may have a length that is substantially the same as a length of the button aperture 172 or may be shorter than a length of the button aperture 172. In the later example, one or more portions of the sensing circuitry (disused in more detail below) may be positioned directly beneath the button aperture 172 or partially within the button aperture 172.

Figure 4:
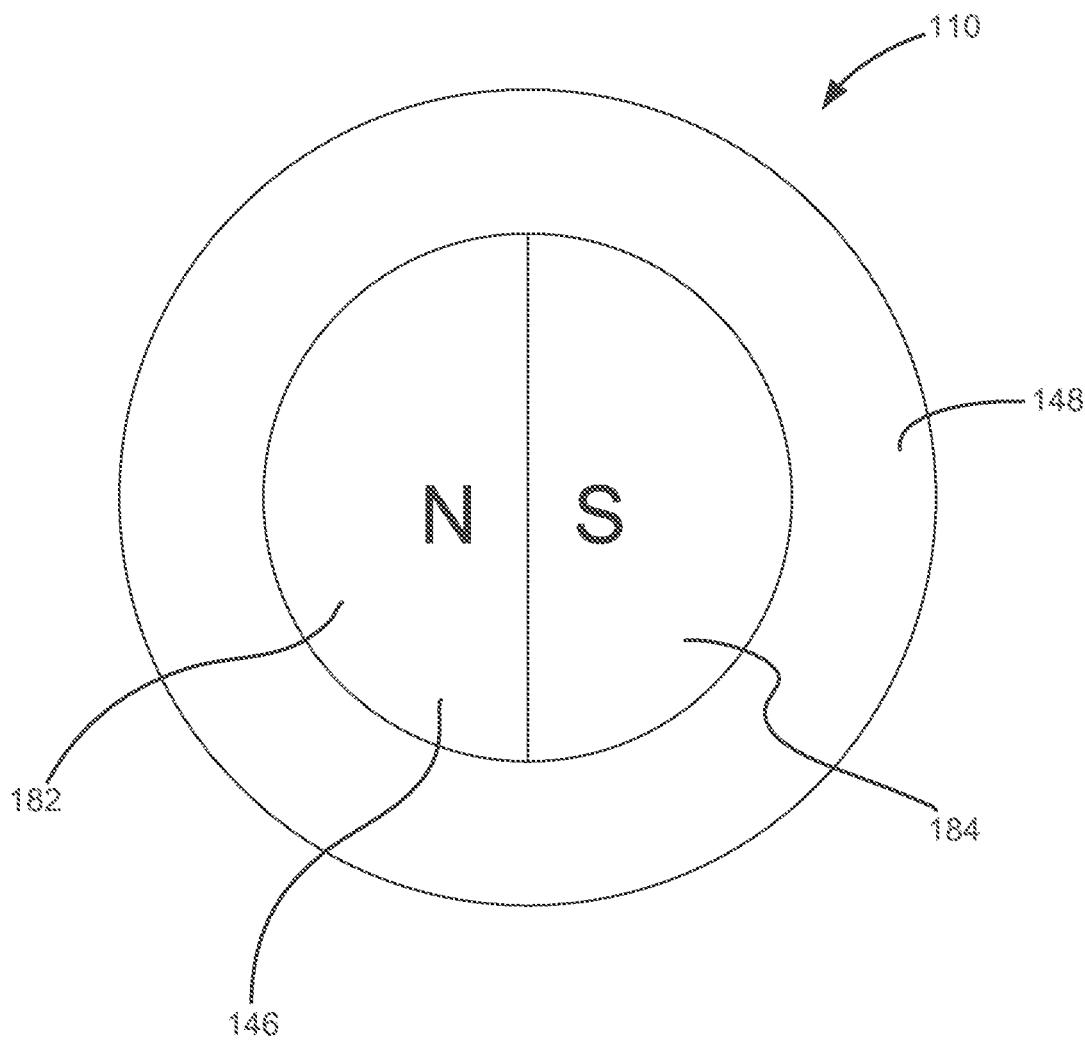
FIG. 4 is a bottom plan view of a crown or input button of the wearable electronic device.

The input button 110 includes a trackable element 146 or encoder positioned on a bottom of the stem 150. FIG. 4 is a bottom plan view of the button 110. With reference to FIGS. 3 and 4, the trackable element 146 may be connected to a bottom end of the stem 150 or may be connected to or defined on the outer surface of the stem 150. The trackable element 146 interacts with a sensing element 142 to allow the sensing element 162 to track movement of the stem 150 by tracking movement of the trackable element 146. As such, the trackable element 146 is connected to the stem 150 such that as the stem 150 moves or rotates, such as due to a user input to the head 148, the trackable element 146 will move correspondingly.

The position, size, and type of material for the trackable element 146 may be varied based on the sensing element 142, which as discussed below may track different types of parameters, such as, but not limited to, optical characteristics, magnetic characteristics, mechanical characteristics, electrical characteristics, or capacitive characteristics. As such, the trackable element 146 can be modified to enhance tracking of the stem 150.

With continued reference to FIGS. 3 and 4, in one embodiment, the trackable element 146 is a magnet, either permanent or electromagnetic. In this embodiment, the trackable element 146 may be a cylindrical disc including a first pole 182 and a second pole 184. The first pole 182 may be the north pole of the trackable element 146 and the second pole 184 may be the south pole of the trackable element 146. The two poles 182, 184 may be diametrically opposed, such that half of the trackable element 146 forms the first pole 182 and other half of the trackable element 146 forms the second pole 184, with the two poles 182, 184 forming half-circle shapes. In other words, the bottom face of the trackable element 146 is split in polarity along its diameter.

In some embodiments, the trackable element may include two or more magnets positioned around the perimeter of the stem 150. In these embodiments, the rotational sensor may be positioned within the button aperture to track rotation of the stem 150.

Figure 5:
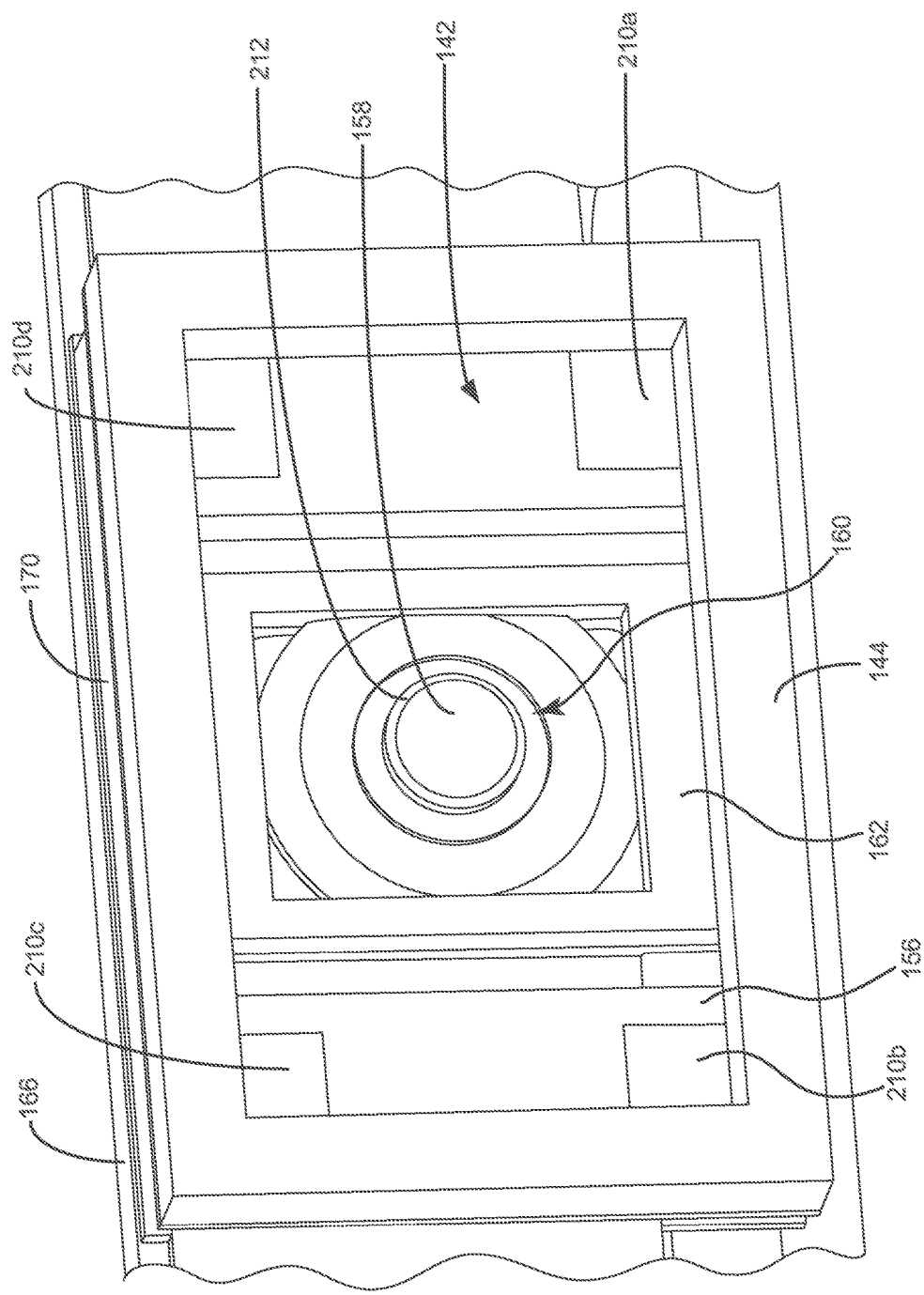
FIG. 5 is a cross-section view of the wearable electronic device taken along line 5-5 in FIG. 1.

The sensing element 142 and corresponding structures will now be discussed in more detail. FIG. 5 is an enlarged cross-section view of the wearable electronic device taken along line 5-5 in FIG. 1. With reference to FIGS. 3 and 5, the sensing element 142 is supported within the enclosure 114 and is configured to detect rotational, vertical, and/or lateral movements of the button 110. The sensing element 142 may be supported on a substrate 166 and includes one or more sensors. For example, the sensing element 142 may include rotation sensors 210a, 210b, 210c, 210d and a switch sensor 160. The rotation sensors 210a, 210b, 210c, 210d and the switch sensor 160 may be positioned within a compartment 212 or other enclosure. The compartment 212 is supported on the substrate 166 by a contact floor 170 that forms a bottom of the sensing element 142. The compartment 212 and the contact floor 170 define a cavity 164 in which the sensors are received.

The rotation sensors 210a, 210b, 210c, 210d are configured to detect rotation of the stem 150 or other portions of the crown or button 110. In the embodiment illustrated in FIGS. 3-5, the rotation sensors 210a, 210b, 210c, 210d may be magnetic sensors that detect changes in magnetic polarity. For example, the rotation sensors 210a, 210b, 210c, 210d may be Hall-effect sensors. In other words, the rotation sensors 210a, 210b, 210c, 210d may be transducers that vary an output signal in response to a magnetic field. In another example, the rotational sensor and/or switch sensor may be an optical sensor and the trackable element may include one or more markings or visible indicators that can be used by the optical sensor to track movement of the stem 150.

In some embodiments, the trackable element may be positioned on the head 148 or exterior portion of the button 110. In these embodiments, the rotational sensor may be in communication (either optically or magnetically) with the input button 110 through the housing or enclosure 114. For example, the enclosure may include a transparent portion or window and an optical sensor may track movement of the crown through the window.

In some examples, the rotation sensors 210a, 210b, 210c, 210d may be spaced apart from one another and located at opposite quadrants of the sensing element 142. This allows the rotation sensors 210a, 210b, 210c, 210d to track rotation of the trackable element 146 as it enters and exits each quadrant or section of the sensing element. However, it should be noted that in other embodiments, there may be only two sensors that may be used to track larger rotational distances of the trackable element 146.

The rotation sensors 210a, 210b, 210c, 210d may be in-plane with one another or may be out of plane with one another. With reference to FIG. 5, in the embodiment illustrated in FIGS. 3 and 5, the rotation sensors 210a, 210b, 210c, 210d are aligned in plane with one another.

Additionally, although the embodiment illustrated in FIG. 5 shows four rotation sensors 210a, 210b, 210c, 210d, there may be fewer or more sensors. For example, only two sensors may be used or more than two force sensors may be used. The additional sensors may provide additional information, such as orientation and/or speed, as well as provide redundancy to reduce error. However, using only two sensors may allow the sensing element 142 to detect rotation of the stem 150, without additional components, which may reduce cost and manufacturing complexities of the wearable device 100.

However, in other embodiments, the rotation sensors 210a, 210b, 210c, 210d may sense parameters other than magnetic fields. For example, the rotation sensors 210a, 210b, 210c, 210d may be optical sensors (e.g., image or light sensors), capacitive sensors, electrical contacts, or the like. In these embodiments, the number, orientation, position, and size of the rotation sensors may be varied as desired.

The switch sensor 160 includes an electrical contact element 168, a collapsible dome 214 and a tip 158. The electrical contact element 168 interacts with a contact element on the floor 170 to indicate when the switch sensor 160 has been activated. For example, when the contact element 168 contacts the floor 170, a circuit may be completed, a signal may be stimulated of created, or the like. The dome 214 is a resilient and flexible material that collapses or flexes upon a predetermined force level. The dome 214 may be a thin metal dome, a plastic dome, or other may be constructed from other materials. The dome 214 may produce an audible sound, as well as an opposing force, in response to a collapsing force exerted by a user. The audible sound and opposing force provide feedback to a user when a user compresses the dome 214. The tip 158 is connected to the dome 214 and when a force is applied to the tip 158, the tip 158 is configured to collapse the dome 214.

Although the switch sensor 160 is illustrated in FIGS. 3 and 5 as being a tactile switch, many other sensors are envisioned. For example, the switch sensor 160 may be a magnetic sensor, a capacitive sensor, an optical sensor, or an ultrasonic sensor. In a specific example, the switch sensor 160 may be capacitive sensor and can detect changes in capacitance as the button 110 is pressed by a user and the stem 150 moves closer to the sensor 160. As such, the discussion of any particular embodiment is meant as illustrative only.

It should be noted that the sensing element 142 including the rotation sensors 210a, 210b, 210c, 210d and the switch sensor 160 may be an integrated sensing component or package that may be installed into the hub 102 as one component. Alternatively, the rotation sensors 210a, 210b, 210c, 210d and the switch sensors 160 may be discrete components that maybe installed as separate components, and may include their own seals, substrates, and the like. Moreover, the wearable electronic device 100 may include only a single sensor, such as either the rotational sensor or the switch sensor.

With continued reference to FIGS. 3 and 5, the sensing element 142 is surrounded by a seal 144. The seal 144, which may be pressure sensitive adhesive, heat activated film, silicone, or other sealing materials, is positioned around a perimeter of the compartment 212. For example, the seal 144 may be a rectangular shaped element that extends around a perimeter of the compartment 212 and sealing member. The seal 144 defines an opening allowing the rotation sensors and the switch sensor to be in communication with the trackable element 146 and stem 150. A membrane 156 or flexible seal extends over the opening and is positioned over the sensing element 142. The membrane 156 acts along with the seal 144 to prevent water, debris, and other elements from reaching the sensing element 142. For example, water and other elements may travel through the button aperture 172 within the enclosure 114, but due to the membrane and the seal 144 may not reach the sensing element 142 and other internal components of the wearable electronic device 100. As another example, in some embodiments, the button 110 may be removable and the seal 144 and membrane 156 prevent water and other elements from damaging the sensing element 142 and/or other internal components of the wearable device 100 while the crown or button is removed.

With reference to FIG. 5, the tip 158 of switch sensor 160 may be positioned above the membrane 156, with a sealing ring 216 sealing the membrane 156 against the sidewalls of the tip 158. In these embodiments, the membrane 156 may be flexible and allow the tip 158 to move vertically without ripping or otherwise compromising the seal of the membrane.

Operation of the input button 110 will now be discussed in further detail. With reference to FIGS. 1, 3, and 5, to provide a first input to the wearable input device 100, the user applies a push force F to the head 148 of the crown or button 110. As the force F is exerted against the head 148, the head and the steam 150 move laterally along the length of the button aperture 172 in the direction of the force F, towards the internal cavity 139 defined by the enclosure 114. As the stem 150 moves into the cavity 139, the bottom end of the stem 150, in some instances, the trackable element 146, transfers at least a portion of the force F to the tip 158.

In response to the force F on the tip 158, the dome 214 collapses, moving the contact 168 into communication with a contact (not shown) on the floor 170. As the dome collapses 214, the user is provided feedback (e.g., through the audible sound of the dome collapsing or the mechanical feel of the dome collapsing). As the contact 168 registers an input, a signal is produced and transmitted to the processing element 124. The processing element 124 then uses the signal to register a user input. It should be noted that in embodiments where the switch sensor 160 is positioned off-axis from the stem 150 (discussed in more detail below), the force F may be angled as shown by angled force AF. This angled force AF may be registered as a second user input, in addition to the on-axis force F.

In some embodiments, the button aperture may be sufficiently large that the switch sensor 120 can be activated by the angled force AF, even when the switch sensor is positioned beneath the stem 150 as shown in FIG. 4. In other words, the angled force AF or other off-axis force may activate the input button 110 when the frictional engagement of the stem 150 with the button aperture 172 sidewall is insufficient to resist the angled force AF. As the angle increases, the frictional force acting on the stem increases and by varying the size of the stem and/or button aperture, a predetermined angle range may be selected for which the angled force AF can activate the switch. For example, a maximum angle of the input force can be selected and when the force is below that angle, the angled force can activate the switch 120 and when the angled force is at or above the maximum angle, the input button may not be activated. As an example, a force applied to the input button at an angle up to 30 or 45 degrees may be able to activate the switch sensor 120.

Additionally, the input button 110 can register rotational inputs. For example, if a user applies a rotation force R to the head 148, the head 148 and stem 150 rotate. As the stem 150 rotates, the trackable element 146 rotates correspondingly. The rotation sensors 210a, 210b, 210c, 210d track movement of the trackable element 146 and produce signals that are transmitted to the processing element 124, which may use signals to determine the rotation speed and direction.

With reference to FIGS. 3-5 in embodiments where the rotation sensors 210a, 210b, 210c, 210d are Hall effect sensors and the trackable element 146 is a magnet, the sensors 210a, 210b, 210c, 210d may use the changes in magnetic field to determine rotation. With reference to FIG. 5, as the stem 150 rotates due to the rotation force R (see FIG. 1), the trackable element 146 rotates along the rotation axis therewith. As the trackable element 146 rotates the two poles 182, 184 rotate over (or near) each of the rotation sensors 210a, 210b, 210c, 210d, causing the rotation sensors 210a, 210b, 210c, 210d to detect a change in the magnetic field.

The changes in magnetic field can be used by the processing element 124 to determine rotation speed and direction the trackable element 146 (and thus stem 150). In this manner, the user may apply a rotational input to the button 110, which may be detected by the sensing element 142. It should be noted that in some embodiments, the speed and/or direction of the user input may be used to activate different applications and/or may be provided as separate input types of the processing element 124. For example, rotation in a first direction at a first speed may correlate to a first type of input and rotation in a second direction at a second speed may correlate to a second input, and rotation in the first direction at the second speed may be a third input. In this manner, multiple user inputs can be detectable through the crown of the wearable input device 100.

As described above, in some embodiments, the rotation sensors 210a, 210b, 210c, 210d may be Hall effect sensors that vary an output signal in response to a change in a magnetic field, e.g., as the trackable element 146 changes orientation with respect to each of the sensors 210a, 210b, 210c, 210d. In these embodiments, the rotation sensors 210a, 210b, 210c, 210d typically draw current from the power source 122 when activated. Thus, the sensors 210a, 210b, 210c, 210d may constantly draw power when searching for a user input to the input button 110.

However, in some embodiments it may be desirable to reduce power consumption of the wearable electronic device 100. For example, it may be desirable for the power source 122 to provide power to the device 100 for multiple days without recharging. In these embodiments, the sensing element 142 can include an inductor near the trackable element 146 or other magnetic element attached to the crown. The inductor will generate a current when the trackable element 146 moves (such as due to a user input to the input button 110). The induced current may be used as a wake or interrupt signal to the sensing element 142. The sensing element 142 may then activate the rotation sensors 210a, 210b, 210c, 210d to allow better rotational sensing for the position of the stem 150.

In the above embodiment, the wearable input device 100 may detect user inputs during zero power or low-power sleep modes. Thus, the life of the power source 122 may be enhanced, while not reducing the functionality of the device 100. Moreover, the induced current could be used to get direction and/or rotational velocity measurements as the trackable element 146 is moved. For example, the current direction and voltage induced by the inductor may be used to determine rotational direction and speed.

In yet another embodiment, the sensing element 142 may include a magnet or magnetic element as the trackable element 146 and the rotation sensor may include an inductor. In this example, as the magnet is moved relative to the inductor, a current is induced within the inductor, which as described above could be used to determine rotational speed and/or velocity. In this manner, the sensing element 142 may not require much, if any, power while still tracking user inputs to the input button 110 or crown.

With reference to FIG. 3, the switch sensor 160 has been illustrated as being positioned on-axis with the stem 150 of the input button 110. However, in other embodiments, the switch sensor 160 may be positioned perpendicular to the stem 150 and/or otherwise angled relative to the stem 150. In these embodiments, the switch sensor 160 can sense off-axis movement, such as a user pressing the head 148 downward at a 45 degree angle. For example, the switch sensor 160 may be positioned within the button aperture 172 and/or adjacent the opening of the button aperture 172 into the enclosure 114 and may track movement of the stem 150 vertically (relative to FIG. 3) within the button aperture 172.

In other embodiments, the wearable device 100 may include both on and off axis switch sensors to detect various types of user inputs. For example, the user may press the top end of the head 148 to force the stem 150 inwards towards the enclosure 114, which may be registered by the on-axis switch. As another example, the user may press the head 148 downward at an angle relative to the button aperture 172. The stem 150 may be pushed towards an inner wall of the button aperture 172 (in which the switch sensor may be positioned), allowing the switch sensor to detect that movement as well. In this example, the button click may be activated by pressing the crown vertically downwards and/or at an angle. Alternatively, the switch sensor 160 may be activated through a pivot point. In other words, the input to the crown or input button 110 may be on-axis, off-axis, perpendicular to the rotation direction, and/or a combination of the different input types.

Figure 6:
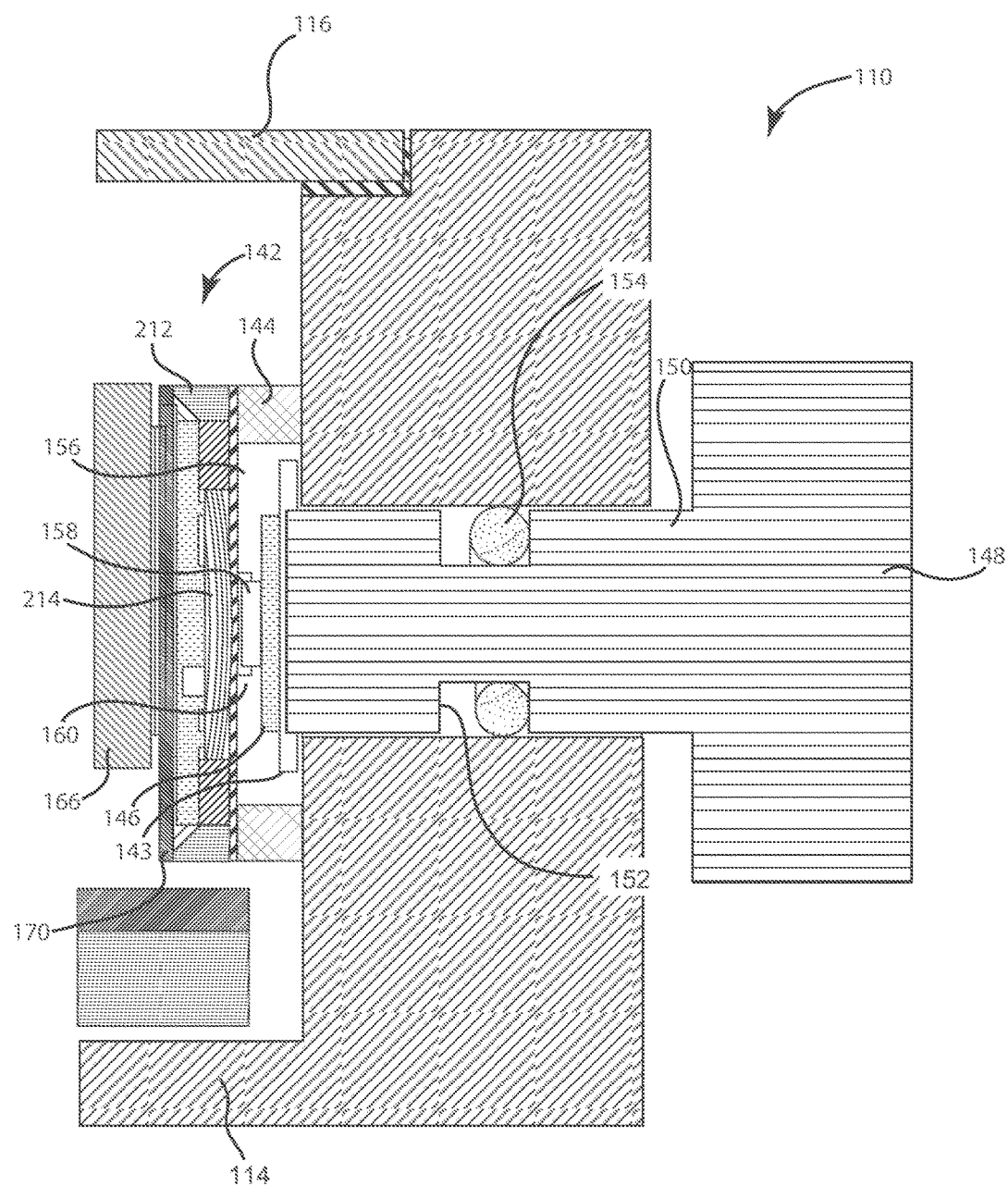
FIG. 6 is a cross-section view of the input button including a first example of a retention component.
Figure 7:
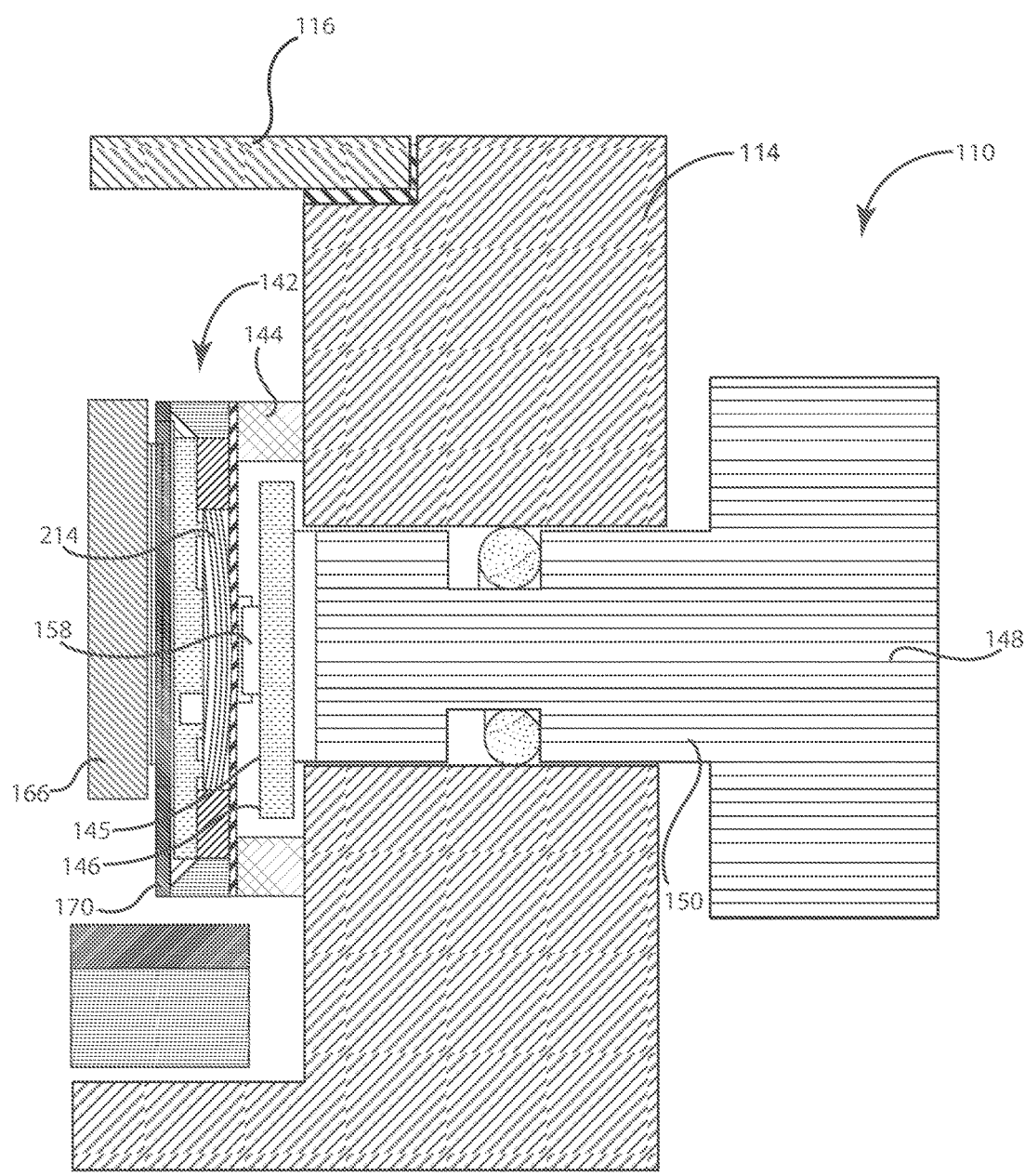
FIG. 7 is a cross-section of the input button including a second example of a retention component.

In some embodiments, the wearable electronic device 100 may include components that may be used to retain the input button within the button aperture 172. FIGS. 6 and 7 illustrate cross-section views of examples of retention components for the input button. With initial reference to FIG. 6, in a first example, the wearable electronic device 100 may include a clip 143 that connects to a bottom end of the stem 150. For example, the clip 143 may be a C-clip that is received around a portion of the stem 150. In this example, the clip 143 allows the stem 150 to rotate within the button aperture 172, but prevents the stem 150 from being removed from the button aperture 712. The clip 143 may have a larger diameter than the button aperture 172 to prevent removal of the input button 110 from the button aperture 172 or may be secured to the enclosure 114 in a manner that prevents the input button from being removed.

The stem 150 may also include a groove or other detent that receives the retaining element 143. In this example, the retaining element 143 clips into position and is secured to the stem 150. As another example, the retaining element 143 may be a bearing, such as a ball bearing, that is received around the outer surface of them stem. In this embodiment, the bearing may have a low friction connection to the stem 150, to allow the stem 150 to rotate, but may have an increased diameter as compared to the stem 150, which helps to secure the stem in position relative to the enclosure.

In some embodiments, the trackable element 146 may also act as a retaining element for the input button 110. For example, the clip 143 in FIG. 6 may be a diametric magnet that may be detectable by the sensing element 142. In other example, with reference to FIG. 7, in another example, the retaining element may be a retaining magnet 145. In this example, the retaining magnet 145 may be formed integrally with the stem 150 or connected to a bottom end thereof. The retaining magnet 145 may have a diameter that is substantially the same as the diameter of the stem 150, which allows the input button 110 to be inserted into the button aperture 172 with the retaining magnet 145 connected thereto. In this embodiment, the trackable element 146 is a second magnet that is positioned within the cavity 139 defined by the enclosure 114. The trackable element 146 includes an opposite polarization from the retaining magnet at least on a side that interfaces with the retaining magnet 145. For example, the retaining magnet 145 may be a plate with magnetic properties, such as, but not limited to, a steel or metal plate, a ferromagnetic material, or the like. In this manner, the trackable element 146 and the retaining magnet 145 may experience an attractive force towards one another.

In some embodiments, the trackable element 146 may be separated from the retaining magnet 145 by a gap. In these embodiments, the gap may be sufficiently dimensioned such that the retaining magnet 145 is able to interact with the trackable element 146 and cause the trackable element 146 to move therewith. Alternatively, the trackable element 146 may be positioned against a surface of the retaining magnet 145

Due the varying polarizations, the trackable element 146 attracts the retaining magnet 145 pulling the input button 110 into the cavity 139. The trackable element 146 may have a diameter configured to retain the button 110 within the button aperture 172. For example, the trackable element 146 may have a larger diameter than a diameter of the button aperture 172 and larger than a diameter of the retaining magnet 145. In these embodiments, the attraction between the retaining magnet and the trackable element may secure the two elements together, and prevent the stem 150 from being pulled through the button aperture, at least because the diameter of the trackable element may be larger than the button aperture.

In some embodiments, the trackable element 146 may also be detectable by the sensing element 142. For example, because the trackable element 146 may be configured to retain the steam 150 within the button aperture 172, the larger diameter of the trackable element 146, as compared to the trackable element shown in FIG. 3 (which may have approximately the same diameter of the stem) may allow the sensing element 142 to more easily track movement of the trackable element 142. That is, the trackable element in this example may have a larger surface area that may be tracked by the sensing element 142, allowing the sensing element 142 to more easily detect its movements.

With continued reference to FIG. 7, in this embodiment, the trackable element 146 rotates with the retaining magnet 145. For example, as the stem rotates, the retaining magnet 145, which is connected to the stem 150, rotates. Continuing with this example, due to the magnetic force between the trackable element 146 and the retaining magnet 145, the trackable element 146 rotates with the stem 150. In these embodiments, the retaining magnet 145 may act to retain the stem 150 to the trackable element 146 and because of the increased size of the trackable element 146 as compared to the retaining magnet 145, the trackable element 146 retains the button 110 within the button aperture 172. The trackable element 146 then interacts with the sensing element 142 to allow the user inputs to the input button 110 to be detected.

The retaining elements shown in FIGS. 6 and 7 are meant as illustrative only. Many other types of retaining elements are envisioned that may be used to connect the input button to the enclosure 114, e.g., flanges, fasteners (such as screws), or the like. In embodiments where the input button includes a retaining element, the input button may have a better "feel" to the user as it may feel less "squishy," which can detract from the user experience. Additionally, the retaining elements 143, 145 help to reduce water, fluid, and other debris from entering into the cavity 139 through the button aperture 172. In other words, because the input button 110 may be securely connected to the enclosure 114, certain elements can be blocked by the button or the retaining member and prevented from entering into the cavity 139 via the button aperture 172. Moreover, the retaining elements may help to prevent the input button from becoming disconnected from the electronic device.

Figure 8:
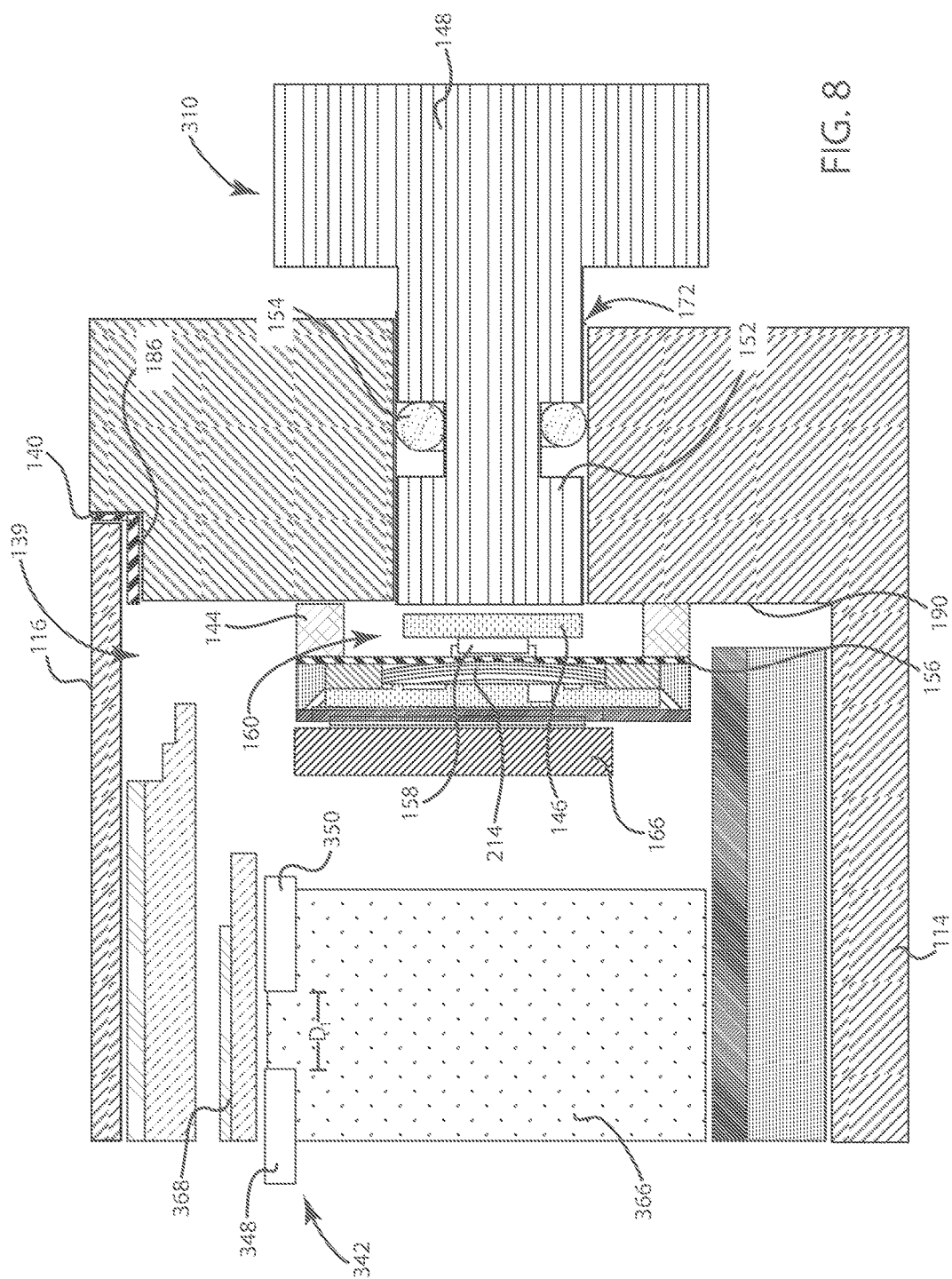
FIG. 8 is a cross-section view of the wearable device including two sensing elements positioned within the cavity of the enclosure.

In some embodiments, the sensing element may be spatially separated from the trackable element and/or positioned out of series with the movement of the stem. FIG. 8 is a cross-section view of the wearable device including two sensing elements positioned within the cavity of the enclosure. With reference to FIG. 6, in this embodiment, the sensing element 342 may include a first magnetometer 348 and a second magnetometer 350. Each magnetometer 348, 350 is configured to sense magnetic fields and optionally the direction of any sensed magnetic field. As one example, each magnetometer 348, 350 may include three Hall effect sensors, each of which may be used to sense a particular magnetic field vector. In other words, each Hall effect sensor in the magnetometers 348, 350 may be configured to measure components in at least one direction, e.g., X, Y, and Z. In this example, each Hall effect sensor may be oriented perpendicularly relative to the other Hall effect sensors. The magnetic field vectors detected by each Hall effect sensor can be combined to determine an overall vector length and/or direction for one or more magnetic fields.

The magnetometers 348, 350 may be connected to a substrate 366, an internal wall of the enclosure 114, or another support structure. Optionally, a shielding element 368 may be positioned around at least a portion of the magnetometer 348, 350. For example, in one embodiment both magnetometers 348, 350 may be positioned beneath the display 116 and the shielding element 368 may reduce interference and noise between the sensing element 342 and the display 116. However, in other embodiments, the shielding element 368 may be omitted or differently configured.

With continued reference to FIG. 8 in some embodiments, the two magnetometers 348, 350 may be spaced apart by a distance D from one another. The distance D may be used to determine user input to the input button 310, and in particular movement of the trackable element 142. In some embodiments, the distance D may be selected such that the magnetometers 348, 350 may be able to sense movement of the trackable element 146, as well as sensing the Earth's magnetic field, which allows the magnetometers to be used as a compass. In other words, the distance D may be sufficiently small such that the Earth's magnetic field may be experienced by both magnetometers in substantially the same manner, but may be sufficiently large that movement of the trackable element may be experienced differently by each magnetometer.

In operation, the sensing element 342 including the magnetometers 348, 350 detects changes in a local magnetic field due to the varying position of the trackable element 146. That is, as the user rotates or otherwise provides an input to the input button 310, the trackable element 146 varies its position relative to the sensing element 342, causing a change in at least one component of the magnetic field. In embodiments where the trackable element 146 includes a magnetic component, varying the position of the trackable element 146 relative to the magnetometers 348, 350 causes the magnetometers to detect a change in the magnetic field. In the embodiment shown in FIG. 8, the distance D between the two magnetometers 348, 350 is known and thus the delta or difference between the signals of the two magnetometers 348, 350 can be determined. This delta can then be used to determine the position of the trackable element 146. In particular, the signals from each magnetometer may be processed using the known distance D and the signals may then be correlated to the user input.

In some embodiments, the two magnetometers 348, 350 may be configured to detect the magnitude of the magnetic field of the trackable element 146, as well as the direction. In this manner, the processing element 124, which is in communication with the sensing element 342, can determine the user input the input button 310, e.g., the direction, speed, and distance of a rotation of the input button, all of which may be correlated to different parameters of the user input to the button.

In instances where the magnetometers in the electronic device can sense both the rotation of the input button and extraneous magnetic fields, such as the Earth's magnetic field, the encoder for the input button may be used simultaneously with a compass function for the electronic device 100. This may allow a user to provide input via the input button 310, while at the same time viewing a compass output (e.g., arrow pointing towards north) on the display 116.

In some embodiments the sensing element 342 may be calibrated to avoid detecting magnetic fields that may be part of the wearable electronic device 100 or components it may interacts with. For example, in some instances a charging cable including a magnetic attachment mechanism may be used with the electronic device. In this example, the magnetic field of the charging cable can be calibrated out of the sensing element 342 such that it may not substantially affect the sensing elements 342 ability to detect the trackable element 146.

With continued reference to FIG. 8, although the sensing element 342 of the input button 310 has been discussed as including two magnetometers 348, 350, in some embodiments the sensing element 342 may include a single magnetometer. By including a single magnetometer, the sensing element 342 may be less expensive to implement as it may include fewer components. However, in these embodiments, larger movements of the input button may be required for the sensing element 342 to detect the user inputs, i.e., the sensitivity may be reduced.

Figure 9:
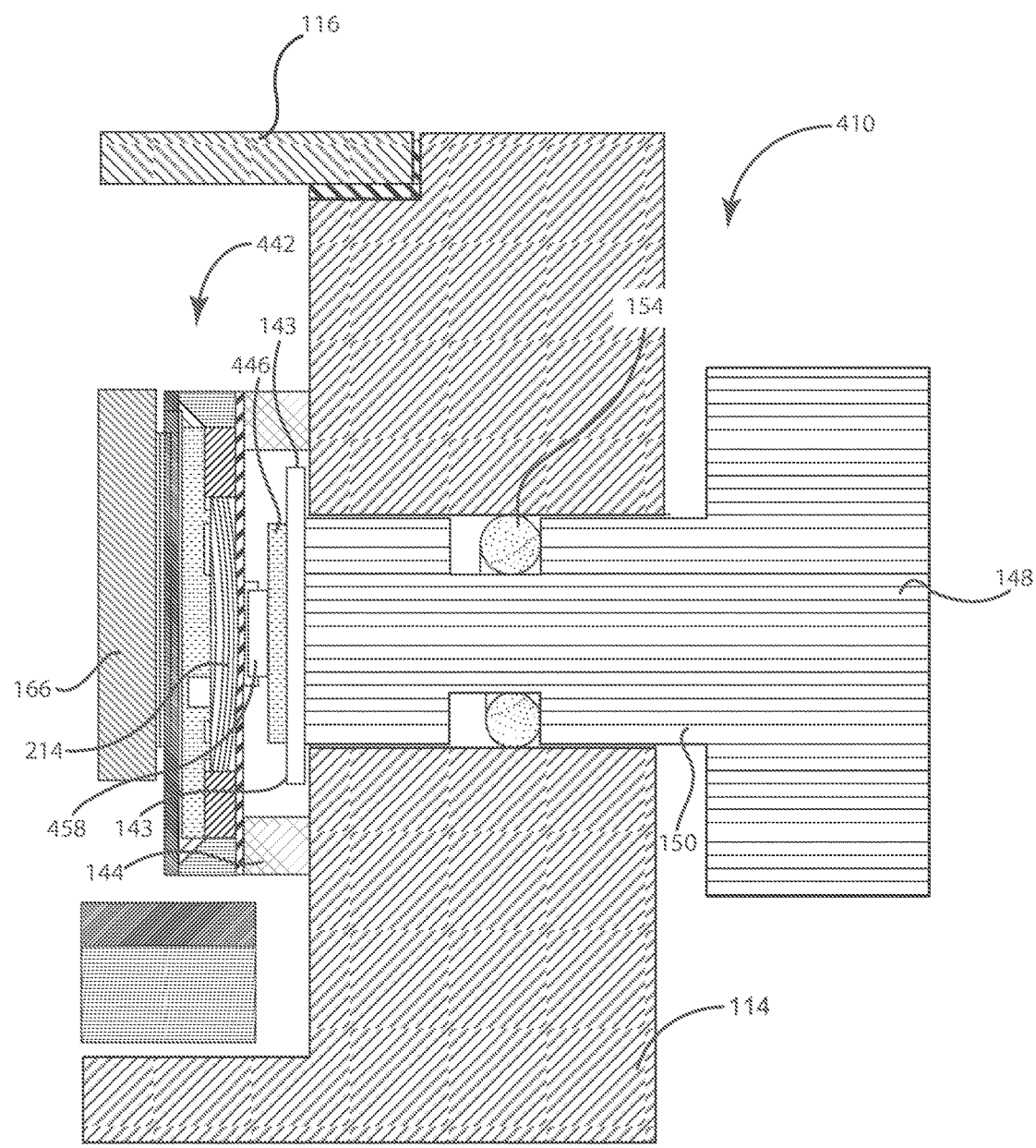
FIG. 9 is a cross-section view of an example of an input button with the trackable element configured to detect movement of the shaft.

In some embodiments, the trackable element may detect orientation, acceleration, or other parameters that can be used to determine a user input. FIG. 9 is a cross-section view of an example of an input button with the trackable element configured to detect movement of the shaft. With reference to FIG. 9, in this embodiment the input button 410 may be substantially similar to the input button 110, but the trackable element 446 may be a gyroscope or other element configured to detect changes in orientation or acceleration. In these embodiments, the trackable element may independently track movement of the stem 150 relative to the enclosure 114. For example, the trackable element 446 is connected to the shaft 150 and as the user provides an input to the button 410, the shaft rotates, and the trackable element 446 detects the direction and speed of rotation.

The sensing element 442 in the embodiment illustrated in FIG. 9 may include a shaft contact 458. The shaft contact 458 is electrically connected to the trackable element 446 and receives signals therefrom. For example, the shaft contact 458 may be a brush contact and be to rotate, allowing the shaft contact 458 and the trackable element 446 to be in electrical communication without substantially restricting rotation or other movement of the shaft 150 (via the trackable element).

In operation, as a user rotates the shaft 150, for example, by rotating the head 148, the trackable element 446 detects the rotation. In particular, the trackable element 446 experiences the rotation of the shaft 150 and detects the direction and speed of rotation. The trackable element 446 then produces an electrical signal that may be transmitted to the shaft contact 458. For example, the shaft contact 458 brushes against the trackable element 446 as the trackable element 446 is spinning with the shaft 150 and detects the signal produced by the trackable element 446.

The shaft contact 458 and the sensing element 442 provide the signal from the trackable element 446 to the processing element 142. The processing element 142 may then compare the signal detected by the trackable element 446 to a rotational signal detected by one or more of the sensors 126 within the electronic device 100. For example, the processing element 142 may subtract the trackable element 446 signal from a signal from a gyroscope sensor connected to the enclosure, logic board substrate 166, or other element separated from the input button 410. In this manner, the processing element 124 may determine the rotation and other movement of the stem 150 separated from rotational movement of the electronic device 100. For example, the wearable electronic device 100 may be moved while worn on the wrist of a user, and if the readings from the device 100 as a whole are not subtracted from the trackable element readings, the user input may be miscalculated. However, in some instances the rotation experienced by the trackable element 446 may be a sufficiently higher magnitude than the rotation experienced by the wearable device 100 and the processing element 124 may not need to subtract the sensor 126 data from the data detected by the trackable element 446 to determine the user input to the button 410.

Figure 10:
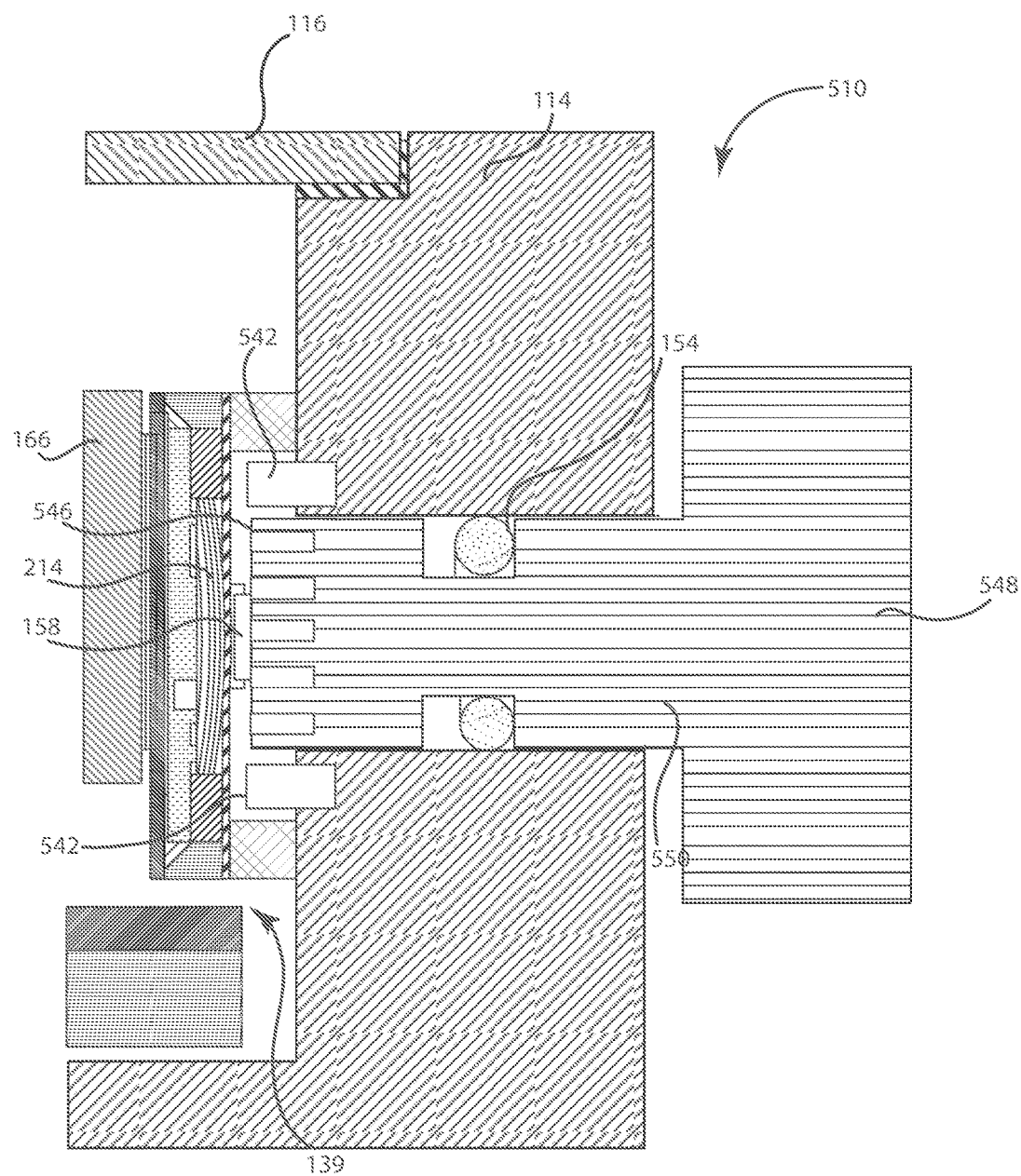
FIG. 10 is a cross-section view the wearable device including another example of the sensing element and trackable element.

In another example, the sensing element may detect features defined on the shaft of the button or otherwise connected thereto. FIG. 10 is a cross-section view the wearable device including another example of the sensing element and trackable element. With reference to FIG. 10, in this example, input button 510 may include a head 548 and shaft 550 extending thereof. The input button 510 may be substantially similar to the input button 110, but the trackable element 546 may be defined around a portion of the shaft 550. For example, the trackable element 546 may be a series of notches, ridges, or other detectable markings (e.g., paint, colors, etc.), or other features. The trackable element 546 may be integrally formed with the shaft 550, such as grooves or ridges formed during manufacturing/molding, or may be a separate element connected to shaft. In some embodiments, the trackable element 546 may extend around a portion of a bottom end of the outer surface of the shaft 550 or the trackable element 546 may extend around the entire outer surface of the shaft 550.

With continued reference to FIG. 10, in this example, the sensing element 542 may be connected to the enclosure 114 and may be positioned adjacent at least a portion of the shaft 550 and trackable element 546. For example, the sensing element 542 may be positioned parallel with the portion of the shaft 550 that extends into the cavity 139 and may be anchored to the enclosure 114 surrounding the button aperture 172. In some embodiments, the sensing element 542 may surround the entire shaft 550 of the input button and in other embodiments the sensing element 542 may surround only portions (e.g., positioned on opposing sides) of the shaft.

The sensing element 542 is configured to detect movement of the shaft 550 by detecting the trackable element 546. As one example, the trackable element 546 may be a magnetic element and the sensing element 542 may be a Hall effect sensor. As a second example, the trackable element may be a colored marking and the sensing element 542 may be an optical sensor. As a third example, the trackable element 546 may be a metallic element or other capacitive sensitive element and the sensing element 542 may be a capacitive sensor. As a fourth example, the trackable element 546 may be a ridge or extension connected to the shaft and the sensing element 542 may be a mechanical contact that is compressed or otherwise selected when the ridge passes over it. In this example, the mechanical contact may also be a gear or other keyed element that engages with the trackable element 546. In particular, the trackable element 546 may be corresponding gear or teeth that engage a mechanical element on the enclosure 114. As the stem 550 rotates, the trackable element 546 will rotate, meshing the gears or teeth with the gears/teeth of the enclosure 114, which may allow the sensing element to determine movement of the stem 550.

With reference to FIG. 10, in operation, the user rotates or provides a push input to the head 548, the stem 550 moves correspondingly. As the stem 550 moves, the trackable element 546 rotates, translates, or otherwise moves relative to the sensing element 542. The sensing element 542 provides a signal (or causes another element connected thereto to provide a signal) to the processing element, registering the user input to the input button 510.

Figure 11:
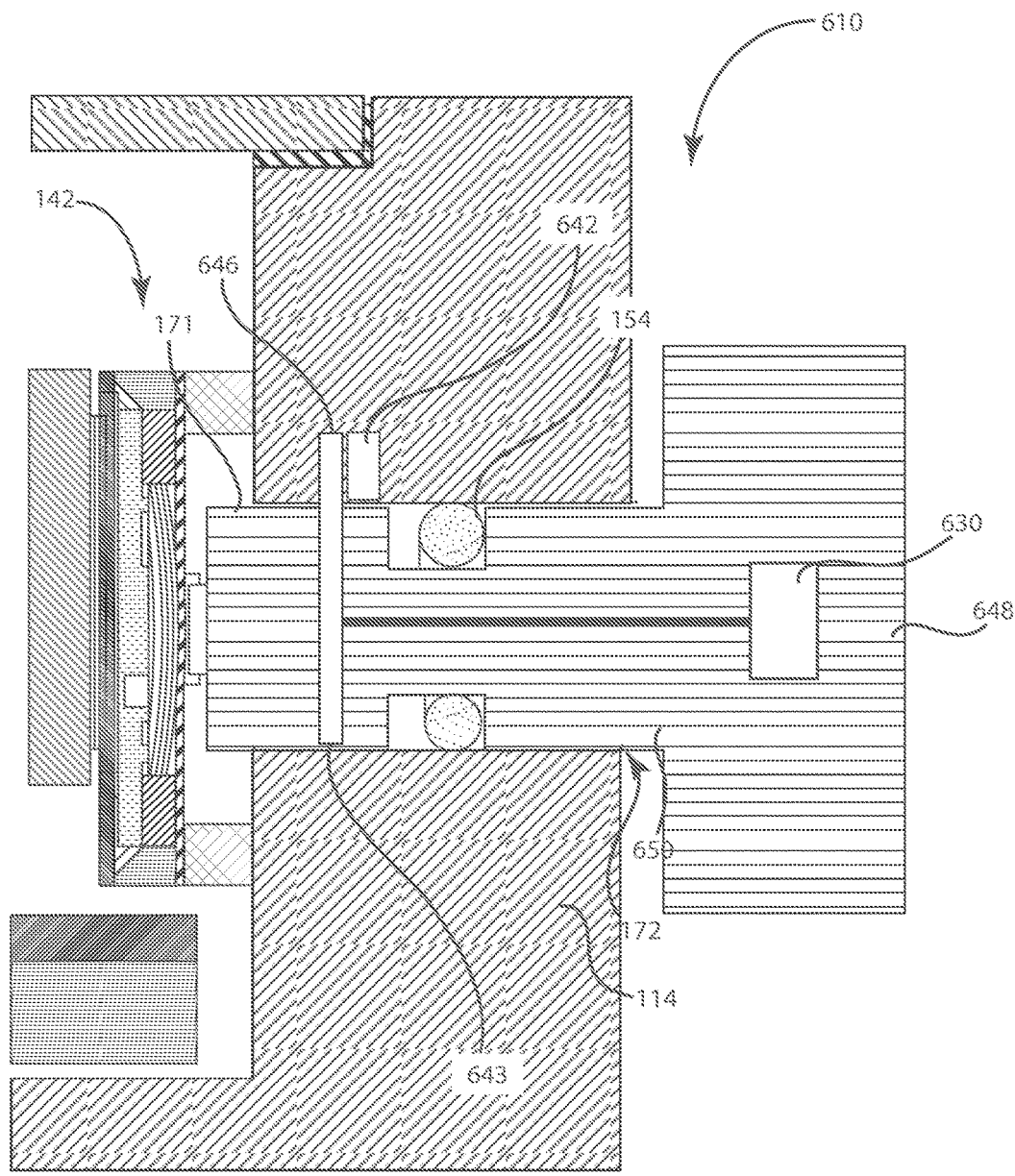
FIG. 11 is a cross-section view of an input button including an electrical connection between the enclosure and internal components of the wearable device and the input button.

In some embodiments, the input button may include an electrical connection between the stem and the enclosure. FIG. 11 is a cross-section view of an input button including an electrical connection between the enclosure and internal components of the wearable device and the input button. The input button 610 may be substantially similar to the input button 110, but may include a direct electrical connection between the stem of the input button and the sensing element. With reference to FIG. 11, the input button 610 may include a sensing element 642 connected to the enclosure 114 and positioned above the aperture receiving the stem 650. The sensing element 642 may be an electrical contact or pad that is connected to an interior sidewall 171 of the button aperture 172. The sensing element 642 may be in communication with the sensing element 124 via one or more connections (not shown) or wirelessly. As another example, the sensing element may be an optical sensor that senses light (which need not be in the visible spectrum) from a sidewall of the shaft. The shaft may be patterned, colored or otherwise marked so that rotation of the shaft varies the light received by the sensing element, thereby allowing the sensing element to detect rotation and/or translation of the shaft.

The trackable element 646 in this embodiment may be a mechanical brush that is positioned on the stem 650. For example, the trackable element 646 may include brush elements 643 positioned on an outer surface of the stem 650 at predetermined positioned. Alternatively, the brush elements 643 may be positioned around an entire perimeter of the outer surface of the stem 650. The trackable element 646 may be one or more conductive elements that interact with the sensing element 642. For example, the brush elements 643 may be copper bristles that electrically interact with the sensing element 642.

With continued reference to FIG. 11, in some embodiments, the trackable element 646 may be in electrical communication with a crown sensor 630 or an input sensor connected to the button. The crown sensor 630 may be positioned in the head 648 and/or stem 650 of the input button 610. The crown sensor 630 may be substantially any type of sensor, such as, but not limited to, microphone, speaker, capacitive sensor, optical sensor, biometric sensor, or the like. The crown sensor 630 may be positioned substantially anywhere on the head 648 and/or stem 650 and there may be two or more crown sensors 630 each connected to location within the input button 610.

In operation, as a user provides an input, such as a rotational force to the head 648, the stem 650 rotates. As the stem 650 rotates, the trackable element 646 contacts the sensing element 642. In particular, the brush elements 643 intermittently or continuously directly contact the sensing element 642 creating an electrical connection between the trackable element 646 and the sensing element 642. The sensing element 642 then creates an input signal corresponding to the sensed movement and provides the input signal to the processing element. In some embodiments, the sensing element 642 may sense the rotational speed and/or number of rotations of the stem 650 based on the number of contacts created between the brush elements 643 and the sensing element 642.

In embodiments where the input button 610 includes the crown sensor 630, the trackable element 646 may communicate one or more signals from the crown sensor 630 to the sensing element 642 or other components in communication with the sensing element 642 (e.g., processing element). As one example, the crown sensor 630 may be a biometric sensor that detects a user's heart rate and/or regularity and provide that data to the processing element within the enclosure 114 via the sensing element and trackable element. As another example, the crown sensor 630 may be a microphone and the trackable element 646 and sensing element 642 may be used to pull data from the microphone on the head 648 (or other location) and provide that data to the processing element 124.

Alternatively or additionally, the sensing element 642 may transfer power to the trackable element and the crown sensor 630. For example, when the brush elements 643 contact the sensing element 646, the sensing element 646 may transfer current through the connection. The current transferred between the sensing element 642 and the trackable element 646 may be used to provide power to the crown sensor 630, as well as any other components (e.g., displays) that are connected to the input button 610 and separated from the cavity of the enclosure.

Figure 12:
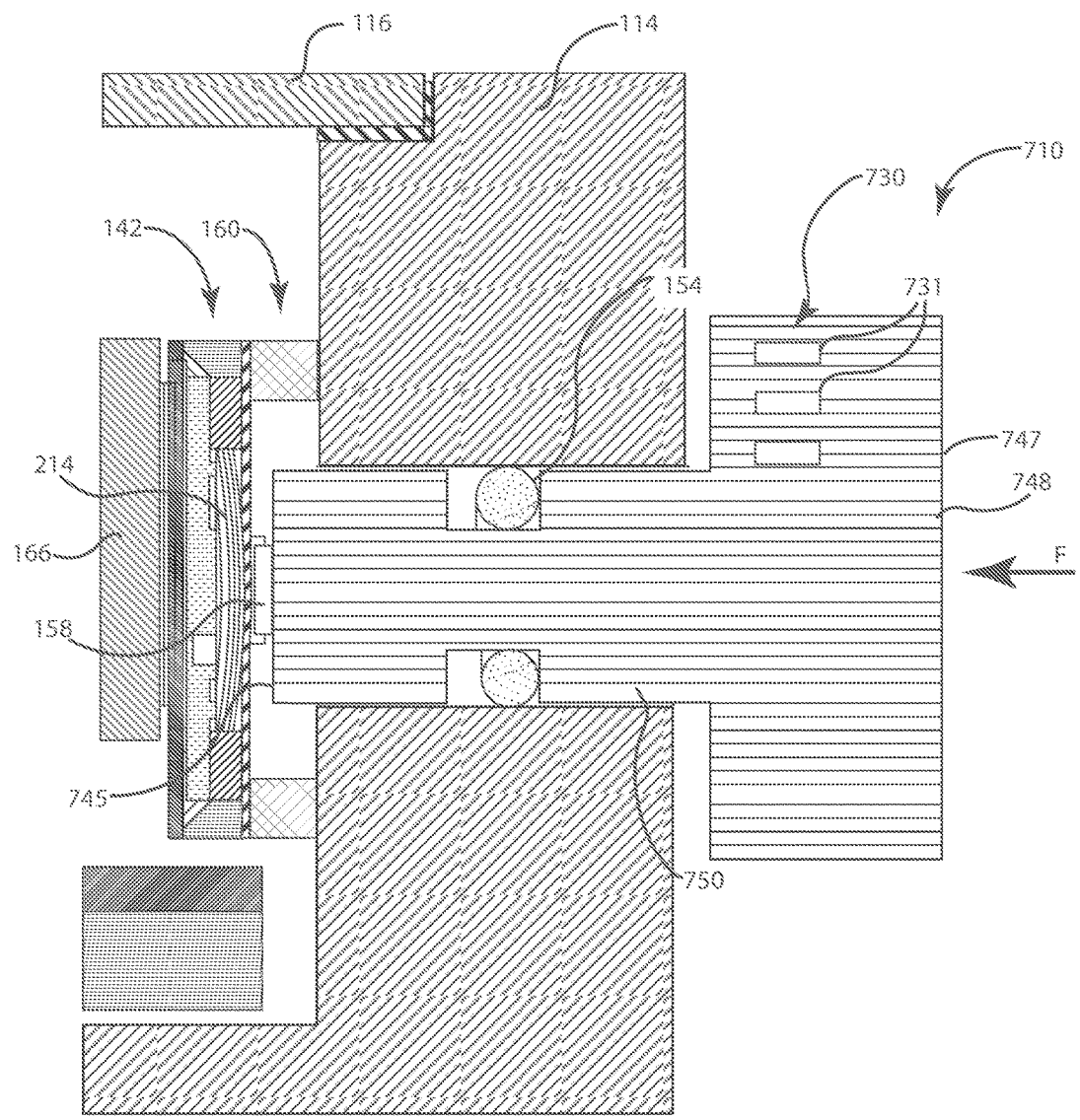
FIG. 12 is a cross-section view of the input button including an input sensor.

In some embodiments, the input button may sense a user input via one or more sensors positioned on the head of the button. FIG. 12 is a cross-section view of the input button including an input sensor. With reference to FIG. 12, in this embodiment, the input button 710 may be substantially similar to the input button 110, but may include an input sensor 730 connected to or defined on the head 748 of the button 710. The input sensor 730 may be similar to the crown sensor 630 and may be configured to detect one or more characteristics that may be used to detect a user input. As some example, the input sensor 730 may include one or more capacitive sensors, optical sensors, resistive sensors, or the like. The input sensor 730 may determine if a user positions his or her finger on the head 648 and if the user moves his or her finger along a portion of the head 648 (e.g., around the exterior perimeter of the head). In one embodiment, the input sensor 730 may include a plurality of sensing elements positioned around the sidewalls defining the head 748, which may be configured to detect a user sliding his or her finger around the head 748.

The input sensor may receive power in a manner similar to the crown sensor, or may be connected to a power source positioned with the enclosure. For example, the input sensor may be connected via one or more wires to a power source within the enclosure or may be inductively coupled to a power source to receive power wirelessly.

In the embodiment illustrated in FIG. 7, the input button 710, and in particular the stem 750 and head 748, may be prevented from rotating. In other words, the input button 710 may translate laterally relative to the button aperture 172, but may not rotate within the button aperture 172. In these embodiments, the user may provide a rotational input to the wearable device by rotating his or her finger around the head 648 (or other areas of the input button) and the input sensor 730 detects the movement of the finger around the head and provides the input to the processing element. In embodiments where the input button 710 translates laterally within the button aperture 172, the stem 750 may be pushed by a user against the switch sensor 160 to detect a user input. For example, the user may press against the face of the head 748 and provide a lateral force to the input button, causing the bottom surface 745 of the stem 750 to press against the tip 158 of the switch sensor 160, causing the switch sensor 160 to register a user input.

In some embodiments, the input button 710 may be fixed relative to the enclosure 114 or may be formed integrally therewith. In these embodiments, the input sensor 730 may detect "button press" inputs. In other words, the input sensor 730 may detect a user input force F applied parallel to the stem 750 or other inputs where the user provides a lateral force to the input button. In this example, as the user presses his or her finger against the face 747 of the head 748, the user's finger may expand as it engages the face 747 or may conform to the shape of the face 747. As the force increases, the user's finger may interact with more sensing elements 731 of the input sensor 730, which may be correlated to the user input force F by the processing element 124. For example the sensing elements 731 may be optical sensors and the user's finger may cover more sensing elements 731 as the force F increases or the sensing elements 731 may be capacitive sensors and the user's finger may interact with more capacitive sensors as the force increases. In these embodiments, the sensing elements 731 may be positioned along the face 747, as well as sidewalls of the head 748 and may be positioned in a pattern, such as rows or circles, or may be positioned randomly.

Figure 13A:
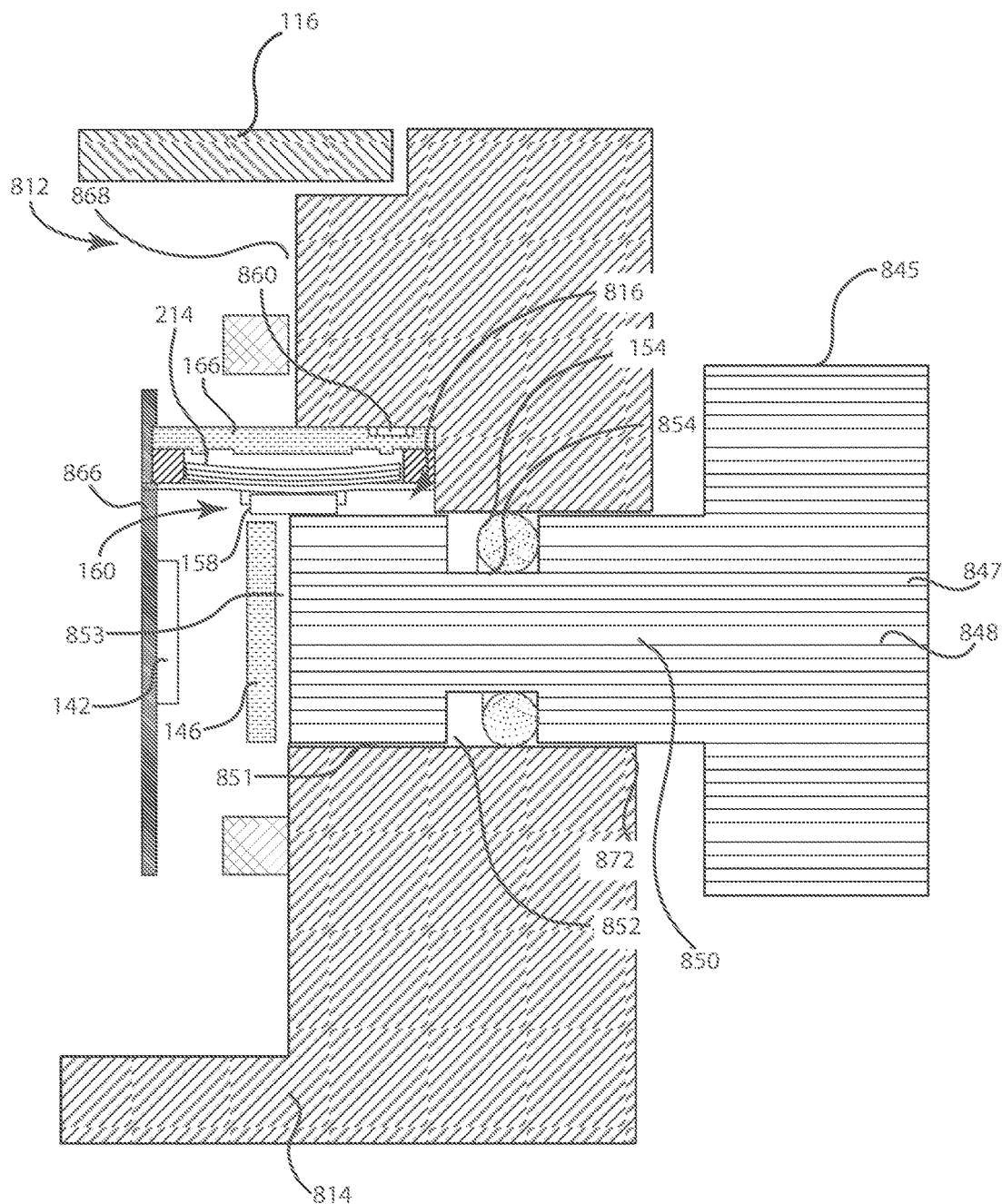
FIG. 13A is a cross-sectional view of an embodiment of the input button including a switch sensor positioned parallel to the stem.
Figure 13B:
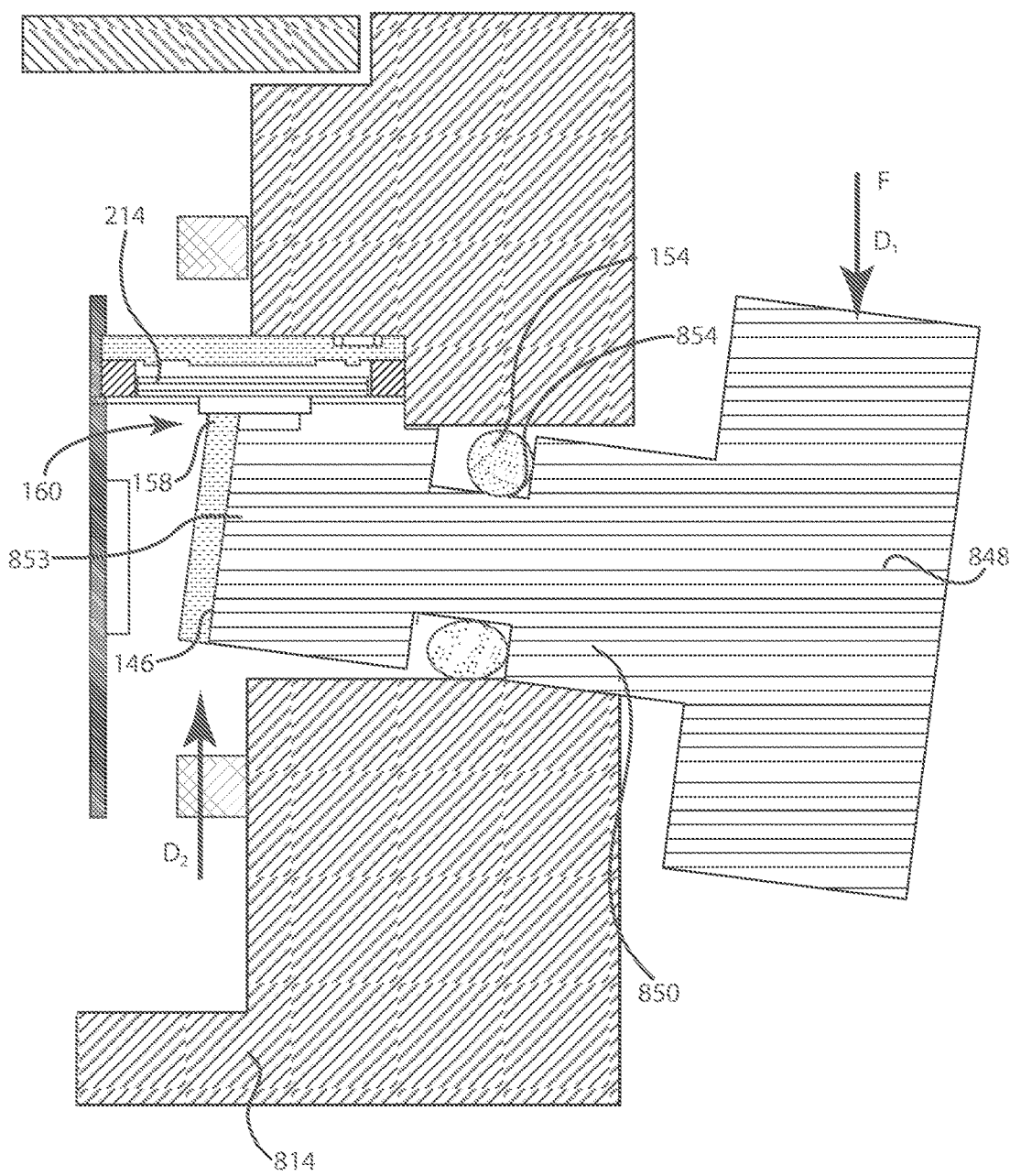
FIG. 13B is a cross-section view of the input button illustrated in FIG. 13A with a force being applied to the head.

In some embodiments, the tactile switch positioned within the enclosure may be positioned within a sidewall of the enclosure surrounding the input button. These embodiments may allow non-lateral forces, such as forces applied perpendicular to the stem to register a user input, as well as provide a tactile sensation to the user. FIG. 13A is a cross-sectional view of an embodiment of the input button including a switch sensor positioned parallel to the stem. FIG. 13B is a cross-section view of the input button illustrated in FIG. 13A with a force being applied to the head. With initial reference to FIG. 13A, in this embodiment, the button assembly may include the input button 810 positioned within an enclosure 814. The enclosure 814 may be substantially similar to the enclosure 114 but may include a switch cavity 816 defined therein. The switch cavity 860 may be formed as an extension or pocket of the button aperture 872. As an example, a sidewall 858 defining the button aperture 872 on a first side of the button aperture 872 may expand outwards to form a switch sidewall 860 that defines the switch cavity 860. In these embodiments, the switch cavity 860 may be open into a device cavity 812 defined by the display 116 and the enclosure 814. In this manner, the switch cavity 860 may be formed as a recess in the internal wall 868 of the enclosure 814. However, in other embodiments, the switch cavity may be at least partially enclosed (see, e.g., FIG. 14).

With continued reference to FIG. 13A, the input button 810 includes a head 848 having a front face 847 and a stem 850 extending from a bottom surface of the head 848. The head 848 may form a flange for the end of the stem 850 and may also include a sidewall 845. The stem 850 may include an annular recess 852 defined around an outer surface thereof. The annular recess 852 may be defined in a middle portion of the stem, towards an end of the stem 850, or otherwise as desired. A sealing element 154 may be received within the annular recess 852. The sealing element 154, as discussed above, may be a compressible element, such as an O-ring or seal cup.

The trackable element 146 may be connected to the bottom of the stem 850 and may be in communication with the sensing element 142. The sensing element 142 is configured to detect movement or rotation of the trackable element 146 to determine user inputs to the input button 810. In some embodiments, the sensing element 142 may be aligned with the stem 850 and the button aperture 872 and may be positioned adjacent to the bottom end of the stem. The sensing element 142 may be supported by a substrate 866.

The button assembly illustrated in FIG. 13A may also include the switch sensor 160. The switch sensor 160, as described in FIG. 3, includes the dome 214 and substrate 166. However, in this embodiment, the switch sensor 160, or at least a portion thereof, is received within the switch enclosure 860. In particular, the switch sensor 160 may be connected to the switch sidewall 860 but may extend partially into the cavity 812. In this manner, the switch sensor 160 may be connected to the substrate 866, to support the substrate 866 and sensing element 142 within the cavity 812. The switch sensor 160 and the switch cavity 816 may be configured such that the tip 158 of the dome 214 may be positioned adjacent to the outer sidewall 851 of the stem 850. In some embodiments, the tip 158 may even be positioned against the outer sidewall 851 of the stem 850. The distance between the tip 158 and the sidewall 851 may determine the amount of force applied to the head 848 in order to activate the switch sensor 160. As an example, the further the distance, the more force that may be required to activate the switch sensor.

In operation, the user may rotate the head 848, which causes the stem 850 to rotate correspondingly. As described in more detail above with respect to FIG. 3, the sensing element 142 tracks the rotation of the trackable element 146 to determine the rotation of the stem 850. For example, the trackable element 146 may be a magnetic element and the sensing element 142 may be a Hall effect sensor, or another magnetic sensor that may detect movement of the trackable element. In other embodiments, the trackable element and the sensing element may be otherwise configured to detect user input to the stem.

With reference to FIG. 13B, if a user applies a force F to the sidewall 845 of the head 848 that angled relative to the button aperture 872, the head 848 may deflect in downwards relative to the button aperture 872. Although the stem 850 is illustrated as impacting or deflecting the enclosure 814 in FIG. 13B, it should be appreciated that the deflection of the stem may be exaggerated for purposes of clarity. Alternatively, in some embodiments a portion of the enclosure may be deformable to a chamfer or other space may be defined in the enclosure to permit the stem to angularly deflect as shown. That is, the head 848 may deflect in the direction of the applied force F and may move vertically relative to the button aperture 872 in a first direction D1. As the head 848 moves downward, the stem 850 may compress a bottom of the sealing element 154 and pivots at pivot point 854. The bottom end 853 of the stem 850 and trackable element 146 then move upwards towards the sensor sidewall 860 of the sensor cavity 816 in a second direction D2. Movement of the bottom end 853 of the stem 850 in the second direction D2 causes the sidewall 858 of the stem 850 to compress the tip 158, collapsing the dome 214. As the dome collapses, the switch sensor 160 registers an input and the dome provides feedback to the user regarding activation of the switch sensor 160.

Figure 14:
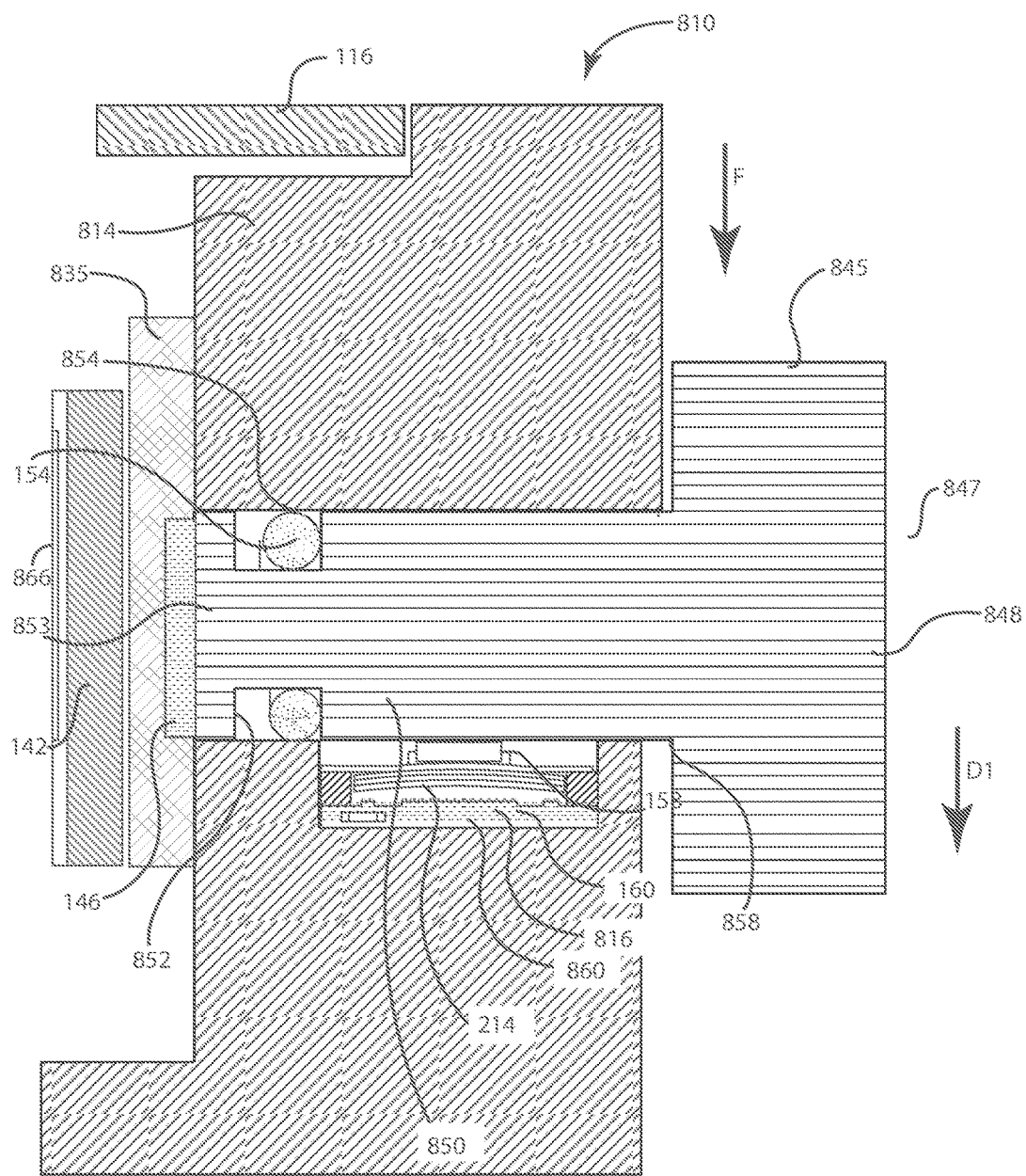
FIG. 14 is a cross-sectional view of another example of the input button illustrated in FIG. 13A.

In some embodiments, a middle portion of the stem may activate the switch sensor. FIG. 14 is a cross-sectional view of another example of the button 810 illustrated in FIG. 13A. With reference to FIG. 14, in this embodiment, the switch cavity 816 may be defined towards an exterior of the enclosure 814 and may be aligned with a middle portion, rather than a bottom end, of the stem. Additionally, the seal cavity 816 may be somewhat enclosed from the cavity 812 when the stem 850 is received into the button aperture 872. In other words, the stem 850 may form a lid or cover for the switch cavity 816.

Additionally, the annular recess 852 may be defined towards the bottom end of the stem 850. In particular, when the stem 850 is positioned within the button aperture 872, the sealing member 154 may be positioned between the cavity 812 and the seal cavity 816.

With continued reference to FIG. 14, a sensing seal 835 may be positioned around the trackable element 146 and the button aperture 872. In this manner, the sensing seal 835 may substantially seal the cavity 812 from the button aperture 872 to prevent fluids, debris, and the like from entering into the cavity 812 from the button aperture 872. Depending on the type of sensing element 142 and trackable element 146, the sensing seal 835 may be positioned between the trackable element 146 and the sensing element 142. However, in other embodiments, the sensing seal 835 may be positioned around both the sensing element and the trackable element.

In operation, with reference to FIG. 14, as a user applies a force F to the sidewall 845 of the head 848, the head 848 may move in the first direction D1 corresponding to the direction of the input force F. The back end 853 of the stem 850 may move upwards, but the middle portion or the belly of the stem 850 may move in the direction D1 with the head 848 due to the pivot point 854 being positioned towards the back end 853 the stem 850. In other words, as the pivot point 854 is located towards the end 853 of the stem 850, the middle portion of the stem 850 moves in the same direction D1 as the force F. The compressibility of the sealing member 154 provides a pivot point for the stem 850, to allow the stem 850 to move within the constraints of the button aperture 872 in order to activate the switch sensor 160.

With reference to FIG. 13B and 14, depending on the location of the pivot point 854, which may be determined by the location of the sealing member 154, the switch sensor 160 may be located at a number of different locations relative to the stem 850 and may be activated by forces applied in a variety of directions. As such, the location of the switch sensor may be varied as desired.

Generally, the sensor may output a signal in response to motion of the stem 850 and/or head. The signal may vary depending on the type of motion. For example, a rotational motion may cause a first signal output, while a lateral motion causes a second signal output and an angular motion causes a third signal output. The processor may receive the signal or data based on the signal, and may use the signal (or related data) to determine the input type and execute or initiate an action based on the input type, as appropriate. Further, in some embodiments, different sensors may sense different types of motion, such that multiple sensors may be used to sense multiple motions.

Figure 15:
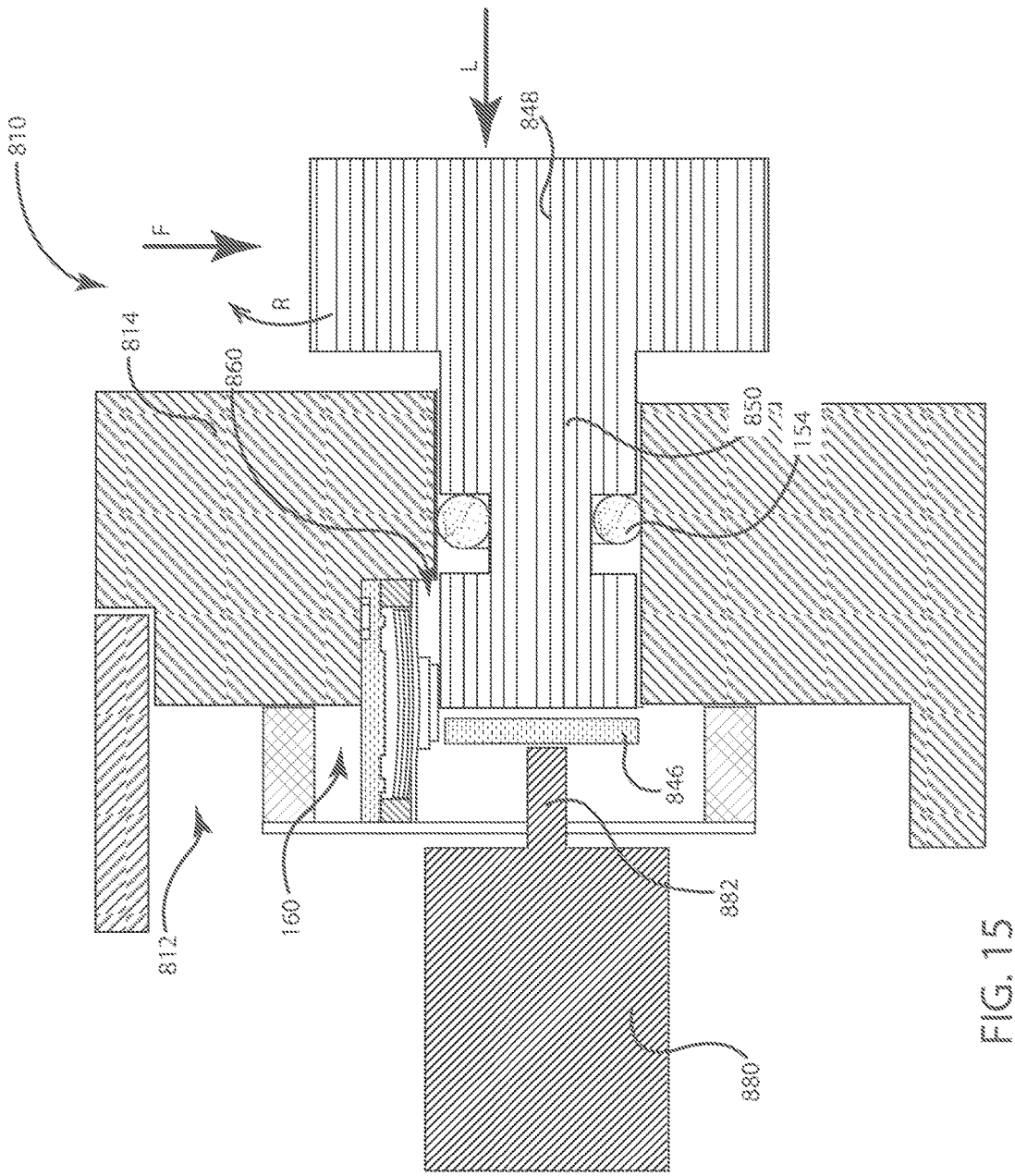
FIG. 15 is a cross-sectional view of the input button including a motor.

In some embodiments, the button assembly may further include a motor coupled to the input button that may provide feedback to a user as well as sense a user input to the button. FIG. 15 is a cross-sectional view of the input button including a motor. With reference to FIG. 15, the input button 810 may be substantially similar to the input button 810 illustrated in FIG. 13A, but may include a motor 880 attached to the stem 850. The motor 880 includes a drive shaft 882 and is configured to detect motion of a trackable element 846, as well as cause motion of the trackable element, via movement of the drive shaft 882. The motor 880 may be, for example, a rotary or linear vibrating motor that is coupled to the stem 850. The drive shaft 882 couples to the stem 850 via the trackable element 846. For example, the trackable element may be secured the bottom surface of the stem 850 and then connects to the drive shaft 882.

In a first mode, the motor 880 may act as a sensing element and detect rotational user input to the input button 810. In embodiments where the motor 880 is a rotary motor, as a user provides a rotational input R to the head 848, the head 848 and stem 850 may rotate correspondingly. As the stem 850 rotates, the trackable element 846 rotates, rotating the drive shaft 882. As the drive shaft 882 rotates, the motor 880 senses the movement and provides a signal to the processing element 124. In embodiments where the motor 880 is a linear motor, as a user provides a linear input L to the head 848, e.g., by pushing the head 848 lateral towards the enclosure 814, the stem 850 moves laterally within the button aperture 872 and the trackable element 846 moves the drive shaft 882 in the lateral direction. The movement of the drive shaft 882 in the lateral direction may be detected by the motor 880, which creates a signal to provide to the processing element 124.

In a second mode, the motor 880 may be used to provide feedback to the user. For example, in instances where the motor 880 is a rotary motor, the drive shaft 882 may rotate the trackable element 846, which in turn rotates the stem 850 and head 848. The rotational movement of the head 848 may be used to provide a visual indication, as well as a tactile indication (when the user is touching the head 848) to the user regarding the selection of a particular input, a state of the device, or the other parameter where feedback may be desired. In an embodiment where the motor 880 is a linear motor, the drive shaft 882 may move the stem 850 linearly within the button aperture 872 to provide feedback to the user.

Additionally, the motor 880 may be used to provide dynamic feedback to the user. For example, the motor 880 may be configured to rotate or otherwise move the stem 850 that is used to provide a "tick" or detent feel, without the requirement for a mechanical detent. As an example, a user may rotate the input button 810 to scroll through a list of selectable items presented on the display 116. As the user passes a selectable item, the motor 880 may move the stem 850 to provide a click or tick feel. Additionally, the motor 880 may selectively increase or decrease a force required to rotate or move the input button. For example, the motor 880 may exert a force in the opposite direction of the user input force, and the user may be required to overcome the force exerted by the motor 880 in order to rotate the input button 810. As another example, motor 880 may be used provide a hard stop to limit the rotation of the head 848. The hard stop may be set at a particular rotational distance or may be based on a list of selectable items, presented items, or the like. As with the feedback example, to provide the hard stop, the motor 880 exerts a force on the stem 850 in the opposite direction of the user applied force, and the force may be sufficiently high to prevent the user from overcoming the force or may be set to indicate the user the location of the hard stop. As yet another example, the motor 880 may provide a "bounce back" or "rubber band" feedback for certain inputs. In this example, as the user reaches the end of a selectable list, the motor may rotate the stem 850 in the opposite direction of the user applied force, which may cause the head 848 to appear to bounce backwards off of the end of the list presented on the display 116.

Additionally or alternatively, the wearable device may include a mechanical detent that may be used to provide feedback to the user as the user provides input to the input button 810. In this example, the mechanical detent may be defined on the inner sidewall of the button aperture 872 and may provide feedback to a user and/or may be used as a stop for limiting rotation of the stem 850. The detent may be used in conjunction with the motor 880 or separate therefrom.

In some embodiments, the motor 880 may include a clutch that selectively engages and disengages the stem 850 and the motor. In these embodiments, the motor 880 may be disengaged to allow a user to provide a manual input without feedback and then may be engaged to provide feedback, prevent user rotation of the stem 850, or the like.

Figure 16:
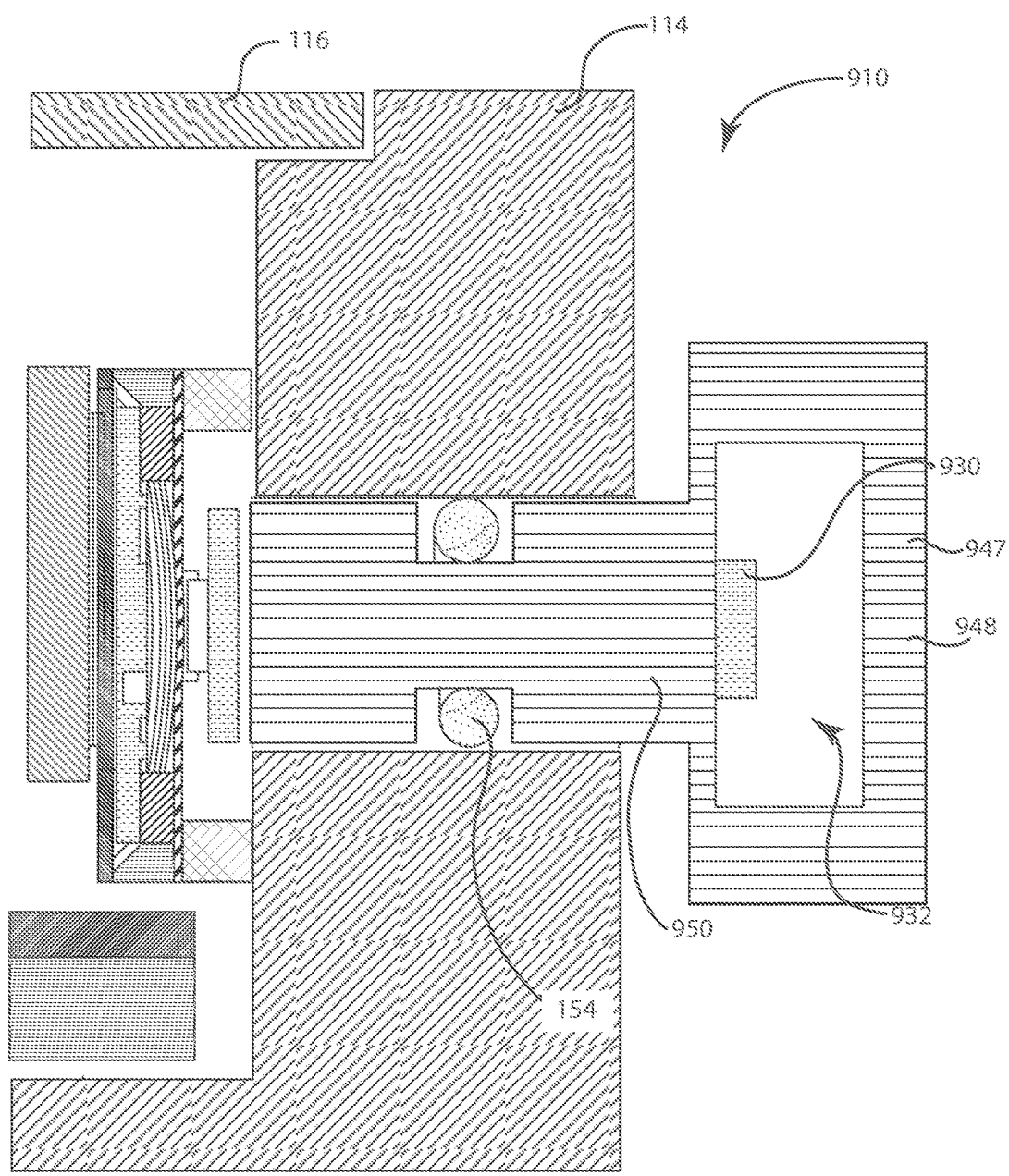
FIG. 16 is a cross-sectional view of the input button including an input sensor connected to the head.

In some embodiments, the input button may include one or more sensors positioned within the head or other portion of the input button that may be used to detect user input thereto. FIG. 16 is a cross-sectional view of the input button including a input sensor connected to the head. With reference to FIG. 16, in this embodiment, the input button 910 may include a head 948 having a face 947 and a stem 950 extending from a back portion of the head 948. The head 948 may define a sensor cavity 932 that receives an input sensor 930. The sensor cavity 932 may be configured to have approximately the same dimensions as the input sensor 930 or may be larger or smaller than the input sensor 930. In some embodiments, the sensor cavity 932 may contain other components, such as a communication component or processing element.

The input sensor 930 may be substantially any type of sensor that may detect one or more parameters. As some non-limiting examples, the sensor 930 may be a microphone, accelerometer, or gyroscope, and may be used to detect user input to the head 948 and/or stem 950. As one example, the input sensor 930 may be an accelerometer and as the user provides input, such as a lateral or rotational force of the input button 910, the accelerometer may detect the change in acceleration, which may be used by the processing element 124 to determine the user input force to the button. Continuing with this example, if the user provides a "tap" or other input to the face 947 or other area of the head 948, the accelerometer may be configured to detect the movement due to the force in order to detect the user input force.

Figure 17:
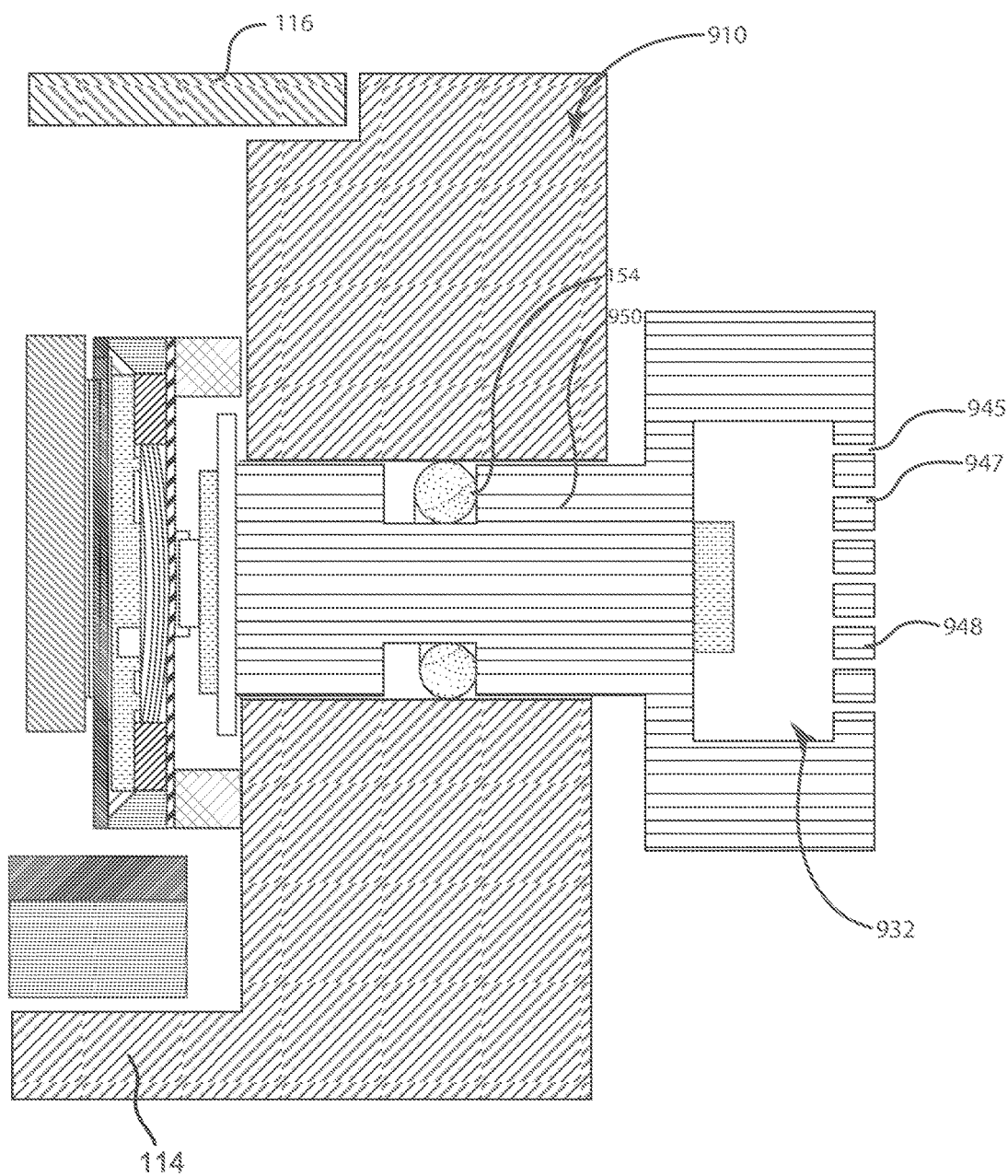
FIG. 17 is a cross-sectional view of the input button of FIG. 16 including apertures defined through the head.

In another example, the input sensor 930 may be a microphone. FIG. 17 is a cross-sectional view of the input button 910. In this example, one or more apertures 945 may be defined through the face 947 of the head 948. The apertures 945 may be in fluid communication with the sensor cavity 932 such that sound waves may travel through the face 947 to reach the sensor 930 positioned within the sensor cavity 932. In this example, the input sensor 930 may detect user input, such as taps, clicks, or presses on the head 948 may detecting the sounds created by the engagement of a user's finger with the head 948. In particular, as the user presses his or her finger against the head 948, the force may create one or more sound waves that may travel through the apertures 945 in the face 947 to reach the sensor 930. In these embodiments the head 948 may form an input port to receive use inputs and may rotate or may not rotate. In other words, the head may be secured in position or may be allowed to rotate to provide the user with haptic feedback and tactile sensation as he or she provides input to the input button.

It should be noted that although the head 948 is shown in FIG. 17 has a plurality of apertures defined therethrough, in some embodiments the apertures may be omitted. For example, the head 948 may be created out of a material that may not dampen sound waves, e.g., a material that may transmit sound waves therethrough. Additionally or alternatively, the input sensor 930 may be positioned against the face 947 and the face 947 may have a sufficiently thin thickness so as to allow sound waves to travel therethrough.

Although the input sensor 930 and sensor cavity 932 have been discussed as being in the head 948, in some embodiments, the input sensor and sensor cavity may be positioned in the sidewalls of the head 948. In these embodiments, the sidewalls may include one or more apertures to allow sound waves to travel through.

The foregoing description has broad application. For example, while examples disclosed herein may focus on a wearable electronic device, it should be appreciated that the concepts disclosed herein may equally apply to substantially any other type of electronic device. Similarly, although the input button may be discussed with respect to a crown for a watch, the devices and techniques disclosed herein are equally applicable to other types of input button structures. Accordingly, the discussion of any embodiment is meant only to be exemplary and is not intended to suggest that the scope of the disclosure, including the claims, is limited to these examples.

The invention claimed is:

1. A wearable electronic device, comprising:
   an enclosure having an aperture defined therethrough;
   an input button having a stem that extends into the aperture and defines an axis extending along a length of the stem;
   an optical sensor positioned along a side of the stem and configured to sense an optical characteristic of the stem to detect a rotation of the input button about the axis;
   a switch including a collapsible dome positioned proximate an end of the stem and configured to detect a translation of the input button along the axis; and
   an O-ring positioned around the stem and within the aperture, the O-ring maintaining contact with an interior surface of the aperture during the rotation of the input button and the translation of the input button.

2. The wearable electronic device of claim 1, further comprising:
   a display positioned at least partially within the enclosure and having a touch sensor configured to detect touch input; and
   a processing element operatively coupled to the display and configured to:
      modify a graphical output of the display in a first manner in response to the rotation of the input button;
      modify the graphical output of the display in a second manner in response to the translation of the input button; and
      modify the graphical output of the display in a third manner in response to the touch input.

3. The wearable electronic device of claim 2, wherein:
   modifying the graphical output of the display in the first manner includes scrolling a list of items displayed on the display; and
   modifying the graphical output of the display in the second manner includes selecting an item of the list of items.

4. The wearable electronic device of claim 3, wherein:
   the optical sensor is configured to detect a direction of the rotation and a speed of the rotation; and
   modifying the graphical output of the display in the first manner is in accordance with the direction and the speed of the rotation.

5. The wearable electronic device of claim 1, wherein:
   the stem defines a groove along a surface of the stem and the O-ring is positioned partially within the groove; and
   the O-ring is configured to move relative to the aperture in response to the translation of the input button.

6. The wearable electronic device of claim 1, wherein:
   the end of the stem is configured to compress the collapsible dome in response to the translation of the input button; and
   the collapsible dome is configured to produce a tactile output in response to the compression.

7. The wearable electronic device of claim 1, wherein the optical sensor is configured to detect the rotation of the input button using light reflected from a surface of the stem.

8. The wearable electronic device of claim 7, wherein the optical sensor detects trackable features formed on the surface of the stem using the reflected light.

9. A watch, comprising:
   an enclosure having an aperture formed in a sidewall of the enclosure;
   an input button having a stem that extends into the aperture;
   a sealing element positioned around the stem and forming a seal between the enclosure and the stem;
   an optical sensor configured to sense an optical characteristic of the stem to detect a rotation of the input button about a longitudinal axis of the stem; and
   a switch including a collapsible dome and configured to detect a translation of the input button toward the enclosure, wherein:
      the sealing element is configured to move within the aperture and maintain the seal during both the translation of the input button and the rotation of the input button.

10. The watch of claim 9, further comprising:
    a display positioned at least partially within the enclosure and having a touch sensor configured to detect touch input;
    a processing element operatively coupled to the display and configured to:
       modify a graphical output of the display in response to the rotation of the input button;
       modify the graphical output of the display in response to the translation of the input button; and
       modify the graphical output of the display in response to the touch input.

11. The watch of claim 9, further comprising:
    a processing element configured to:
       perform a first function in response to the rotation of the input button; and
       perform a second, different function in response to the translation of the input button.

12. The watch of claim 11, further comprising:
    a display operatively coupled to the processing element; wherein:
       the first function includes causing a list of items to scroll across the display in accordance with a direction of the rotation of the input button; and
       the second function includes selecting one of the list of items in accordance with the translation of the input button toward the enclosure.

13. The watch of claim 12, wherein:
    the optical sensor is further configured to detect a speed of the rotation; and
    a scrolling speed of the scrolling varies in accordance with the speed of the rotation of the input button.

14. The watch of claim 9, wherein the switch comprises:
an electronic contact connected to the collapsible dome, wherein
the translation of the input button causes a compression of the collapsible dome to activate the electronic contact.

15. The watch of claim 9, wherein the optical sensor is configured to detect the rotation of the input button using light reflected from the stem.

16. The watch of claim 9, wherein the input button comprises:
a head coupled to a first end of the stem; and
the switch is positioned proximate to a second end of the stem.

17. A wearable electronic device, comprising:
an enclosure defining an aperture and an opening;
a display at least partially received within the opening;
an input button extending from an outside of the enclosure, through the aperture, and into an inside of the enclosure;
an optical sensing element within the enclosure and configured to sense a surface of the input button;
a switch having a collapsible dome positioned proximate to an end of the input button; and
a sealing element positioned within the aperture and around a portion of the input button, wherein:
the optical sensing element is operable to track a rotation of the input button about an axis by sensing the surface of the input button;
the switch is operable to detect a translation of the input button along the axis; and
the sealing element is configured to maintain a seal between the input button and the enclosure during both the rotation of the input button and the translation of the input button.

18. The wearable electronic device of claim 17, wherein:
the display includes a touch sensor configured to detect touch input; and
the wearable electronic device further comprises a processing element operatively coupled to the display and configured to:
modify a graphical output of the display in response to the rotation of the input button;
modify the graphical output of the display in response to the translation of the input button; and
modify the graphical output of the display in response to the touch input.

19. The wearable electronic device of claim 17, wherein the optical sensing element is operable to detect a direction and a speed of the rotation of the input button.

20. The wearable electronic device of claim 19, wherein a graphical output of the display is varied in accordance with the direction and the speed of the rotation of the input button.

* * * * *